(12) United States Patent
Abe et al.

(10) Patent No.: US 8,346,293 B2
(45) Date of Patent: Jan. 1, 2013

(54) RADIO COMMUNICATION DEVICE SUPPORTING A PLURALITY OF COMMUNICATION SCHEMES

(75) Inventors: Katsuaki Abe, Kanagawa (JP); Michiaki Matsuo, Tokyo (JP); Noriaki Saito, Tokyo (JP); Takenori Sakamoto, Tokyo (JP); Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1069 days.

(21) Appl. No.: 11/629,387

(22) PCT Filed: Jun. 13, 2005

(86) PCT No.: PCT/JP2005/010793
§ 371 (c)(1),
(2), (4) Date: Dec. 13, 2006

(87) PCT Pub. No.: WO2005/122414
PCT Pub. Date: Dec. 22, 2005

(65) Prior Publication Data
US 2008/0051129 A1    Feb. 28, 2008

(30) Foreign Application Priority Data
Jun. 14, 2004   (JP) ................ 2004-176223

(51) Int. Cl.
*H04M 1/00* (2006.01)
(52) U.S. Cl. ............ 455/550.1; 370/965.21; 370/437; 370/477; 370/342; 370/334; 370/338; 370/381; 455/452.2; 455/561; 455/442; 455/135
(58) Field of Classification Search ........... 455/452.2, 455/561, 442, 135, 452.1, 446, 562.1, 63.1, 455/63.4, 45; 370/395.21, 437, 477, 342, 370/338, 349, 476, 334, 381; 709/220; 342/367, 342/373
See application file for complete search history.

(56) References Cited

U.S. PATENT DOCUMENTS 5,999,990 A    12/1999  Sharrit
6,421,005 B1 *  7/2002  Weaver et al. ............. 342/367
(Continued)

FOREIGN PATENT DOCUMENTS
EP    0 936 755    8/1999
(Continued)

OTHER PUBLICATIONS

PCT International Search Report dated Oct. 4, 2005.
(Continued)

*Primary Examiner* — Joseph Arevalo
(74) *Attorney, Agent, or Firm* — Dickinson Wright PLLC

(57) ABSTRACT

There are provided a plurality of systems of reconfigurable radio processing unit (102) whose function and performance can be modified. A control unit (104) collects quality information on the communication link in communication methods received at respective radio processing systems (102a, 102b). According to this, the control unit (104) selects an optimal communication method and transmission mode from a plurality of communication methods and transmission modes (for example, diversity transmission between a plurality of systems, diversity transmission by a single communication method, and MIMO channel multiplex transmission). By modifying configurations of the reconfigurable radio processing unit (102) according to the selected communication method and transmission mode, it is possible to communicate at a desired transmission mode. Thus, it is possible to perform an optimal transmission to the communication link according to the quality condition and other request condition.

12 Claims, 20 Drawing Sheets

U.S. PATENT DOCUMENTS

| | | | |
|---|---|---|---|
| 7,092,431 B2 * | 8/2006 | Maeda et al. | 375/144 |
| 7,224,704 B2 * | 5/2007 | Lu et al. | 370/476 |
| 2001/0046883 A1 * | 11/2001 | Jechoux | 455/562 |
| 2002/0126675 A1 * | 9/2002 | Yoshimura et al. | 370/395.21 |
| 2002/0191572 A1 * | 12/2002 | Weinstein et al. | 370/338 |
| 2004/0253955 A1 * | 12/2004 | Love et al. | 455/442 |
| 2005/0053034 A1 * | 3/2005 | Chiueh | 370/331 |
| 2005/0099975 A1 | 5/2005 | Catreux | |
| 2005/0120097 A1 * | 6/2005 | Walton et al. | 709/220 |
| 2005/0135403 A1 * | 6/2005 | Ketchum et al. | 370/437 |
| 2005/0148301 A1 | 7/2005 | Nagai et al. | |
| 2005/0227698 A1 * | 10/2005 | Nonin et al. | 455/452.2 |
| 2006/0003795 A1 | 1/2006 | Yamanaka et al. | |

FOREIGN PATENT DOCUMENTS

| | | |
|---|---|---|
| EP | 1 487 135 | 12/2004 |
| EP | 1 551 107 | 7/2005 |
| JP | 2000216698 | 8/2000 |
| JP | 2001189675 | 7/2001 |
| JP | 2003244045 | 8/2003 |
| JP | 2004153800 | 5/2004 |
| WO | WO 04/002011 A1 * | 12/2003 |

OTHER PUBLICATIONS

European Search Report dated Sep. 22, 2011.

* cited by examiner

| COMMUNICATION QUALITY | | COMMUNICATION SCHEME | | TRANSMISSION MODE |
|---|---|---|---|---|
| SCHEME A (CELLULAR: 2 Mbps) | SCHEME B (RADIO LAN: 11 Mbps) | SYSTEM A | SYSTEM B | |
| — | GOOD | B | B | COMMUNICATION SCHEME B MIMO TRANSMISSION |
| GOOD, PASS | PASS, POOR | A | B | INTERCOMMUNICATION SCHEME DIVERSITY |
| GOOD | FAILED | A | A | COMMUNICATION SCHEME A MIMO TRANSMISSION |
| PASS | ≦POOR | A | — | COMMUNICATION SCHEME A ALONE |
| ≦POOR | PASS | — | B | COMMUNICATION SCHEME B ALONE |
| POOR | FAILED | A | A | COMMUNICATION SCHEME A DIVERSITY |
| ≦POOR | POOR | B | B | COMMUNICATION SCHEME B DIVERSITY |
| FAILED | FAILED | A | B | COMMUNICATION STANDBY STATE |

FIG.6

| COMMUNICATION QUALITY INFORMATION | SCHEME A | SCHEME B |
|---|---|---|
| GOOD | SL_A+20dB < CNR_A | SL_B+20dB < CNR_B |
| PASS | SL_A+1dB ≦ CNR_A < SL_A+20dB | SL_B+1dB ≦ CNR_B < SL_B+20dB |
| POOR | SL_A−3dB ≦ CNR_A < SL_A+1dB | SL_B−3dB ≦ CNR_B < SL_B+1dB |
| FAILED | CNR_A < SL_A−3dB | CNR_B < SL_B−3dB |

CNR_A : RECEPTION CNR IN SCHEME A
CNR_B : RECEPTION CNR IN SCHEME B
SL_A  : SENSITIVITY LEVEL IN SCHEME A (EX: RECEIVED CNR VALUE SUCH THAT RECEIVED BER BECOMES $10^{-5}$)
SL_B  : SENSITIVITY LEVEL IN SCHEME B (EX: RECEIVED CNR VALUE SUCH THAT RECEIVED BER BECOMES $10^{-5}$)

FIG.10

| COMMUNICATION QUALITY | | USER REQUIREMENTS | COMMUNICATION SCHEME | | TRANSMISSION MODES |
| --- | --- | --- | --- | --- | --- |
| SCHEME A (CELLULAR: 2 Mbps) | SCHEME B (WIRELESS LAN: 11Mbps) | | SYSTEM A | SYSTEM B | |
| — | GOOD | ARBITRARY | B | B | COMMUNICATION SCHEME B MIMO TRANSMISSION |
| GOOD, PASS | PASS | HIGHEST-QUALITY MODE | A | B | INTERCOMMUNICATION SCHEME DIVERSITY |
| GOOD, PASS | PASS | LOWEST-FEE MODE | — | B | COMMUNICATION SCHEME B ALONE |
| GOOD, PASS | POOR | HIGHEST-QUALITY MODE | A | B | INTERCOMMUNICATION SCHEME DIVERSITY |
| GOOD, PASS | POOR | LOWEST-FEE MODE | A | — | COMMUNICATION SCHEME A ALONE |
| GOOD | FAILED | HIGHEST-QUALITY MODE | A | A | COMMUNICATION SCHEME A MIMO TRANSMISSION |
| GOOD | FAILED | LOWEST-FEE MODE | A | — | COMMUNICATION SCHEME A ALONE |
| PASS | ≦ POOR | ARBITRARY | A | — | COMMUNICATION SCHEME A ALONE |
| ≦ POOR | PASS | ARBITRARY | — | B | COMMUNICATION SCHEME B ALONE |
| POOR | FAILED | ARBITRARY | A | A | DIVERSITY |
| ≦ POOR | POOR | ARBITRARY | B | B | DIVERSITY |
| FAILED | FAILED | ARBITRARY | A | B | COMMUNICATION STANDBY STATE |

FIG.12

RADIO COMMUNICATION DEVICE SUPPORTING A PLURALITY OF COMMUNICATION SCHEMES

TECHNICAL FIELD

The present invention relates to a radio communication apparatus capable of supporting a plurality of radio communication schemes.

BACKGROUND ART

In conventional radio communication apparatuses, as a configuration capable of supporting a plurality of radio communication schemes with a single apparatus, there is a configuration in which wireless sections capable of performing communication respectively in the plurality of communication schemes are provided, and the used wireless sections are switched as necessary (See Patent Document 1). FIG. 1 shows the same configuration as in the conventional radio communication apparatus disclosed in Patent Document 1.

In FIG. 1, scheme 1 compatible wireless section 902 is connected to antenna 901 supporting a first communication scheme and performs predetermined radio signal processing supporting the first communication scheme. Scheme 2 compatible wireless section 904 is connected to antenna 903 supporting a second communication scheme and performs predetermined radio signal processing supporting the second communication scheme. Upper layer processing section 905 is, for example, configured with a CPU (central processing unit) that determines which of the first communication scheme and the second communication scheme is selected to perform communication, and executes processing at the upper layer in each communication. That is, in the radio communication apparatus shown in FIG. 1, modules supporting the plurality of communication schemes are provided respectively, and one of the schemes is selected to perform communication as necessary.

Also, there are apparatuses adopting a configuration capable of supporting the plurality of the communication schemes with a single radio apparatus, what is called, software radio equipment (See Patent Document 2). FIG. 2 shows a configuration that is the same as a digital signal processing section of the radio communication apparatus configured with the conventional software radio equipment that is disclosed in Patent Document 2.

In the apparatus configuration shown in FIG. 2, digital signal processing section 910 executes so-called A/D conversion processing in which analog/digital conversion section 911 receives analog received signals such as RF signals, IF signals and baseband signals from the wireless section upon reception, performs quantization, converts these signals to digital signals, and outputs the digital signals. The obtained digital signals are stored temporarily in I/O buffer 912 as necessary, and readout and supplied to bus 913 as necessary. The supplied digital signals are subjected to digital signal processing for reception based on a predetermined program in FPGA (Field Programmable Gate Array) section 914 and DSP (Digital Signal Processor) section 915, and the obtained reception data sequences are supplied to a block (e.g., a CPU section) etc. that performs application processing.

Upon transmission, the transmission data supplied via bus 913 from the application processing section are subjected to digital signal processing for transmission based on the predetermined program in FPGA section 914 and DSP section 915. Thus, the obtained transmission signals are temporarily stored in I/O buffer 912 as necessary, read out as necessary, converted to analog signals such as baseband signals, IF signals and RF signals for transmission in analog/digital conversion section 911, and supplied to the wireless section. In Patent Document 2, the software radio equipment is configured by connecting digital signal processing section 910 and the wireless section.

The predetermined programs that are executed in FPGA section 914 and DSP section 915 may be, for example, a software program for DSP or a program describing the circuit configuration in the FPGA. These programs are stored in a re-writable memory and can be read out upon start up of the apparatus or as necessary. Digital signal processing section 910 can support different communication schemes by reading-in and executing different programs as necessary in FPGA section 914 and DSP section 915.

Patent Document 1: Japanese Patent Application Laid-open No. 2000-216698 (Page 6, FIG. 1)
Patent Document 2: Japanese Patent Application Laid-open No. 2001-189675 (Page 7, FIG. 1)

DISCLOSURE OF THE INVENTION

Problems to be Solve by the Invention

However, in the conventional configuration as shown in FIG. 1, in order to support a plurality of communication schemes and perform communication, a plurality of wireless sections respectively supporting the plurality of types of communication schemes need to be provided. Therefore, there is a problem of providing disadvantages from the aspects of apparatus size and manufacturing costs. In particular, this problem becomes prominent in the case where the number of communication schemes that should be supported is large.

As one of the methods to solve this problem, the configuration for the software radio equipment as shown in FIG. 2 has been disclosed. However, in the configuration shown in FIG. 2, only a single radio processing system in a single communication scheme can perform communication simultaneously. In particular, diversity communication using a plurality of radio processing systems, MIMO (Multi-Input Multi-Output) channel transmission, communication using beam forming with an antenna array configuration and simultaneous communication with a plurality of communication schemes are not considered. Moreover, switching control of the above-described communication modes according to the situations is not considered.

It is therefore an object of the present invention to provide a radio communication apparatus capable of performing communication simultaneously with a plurality of communication schemes or performing communication using a single communication scheme via a plurality of radio processing systems. It is a further object of the present invention to provide a radio communication apparatus capable of realizing communication environment with higher efficiency and high reliability by selecting an appropriate communication scheme and mode and performing switching and control according to the situations of communication link and requirements of a user.

Means for Solving the Problem

In order to solve the aforementioned problem, a radio communication apparatus of the present invention is configured with a plurality of antennas, a plurality of reconfigurable radio processing sections that are provided corresponding to the antennas, a control section that controls the plurality of reconfigurable radio processing sections independently and changes processing contents of each of the reconfigurable radio processing sections independently.

According to this configuration, according to the quality of communication link and the request of the user, a desirable transmission mode can be selected to carry out communication from a plurality of transmission modes such as a mode for performing diversity transmission and reception using only a single communication scheme, a mode for performing space multiplexing transmission using a MIMO channel, a mode for performing diversity transmission among the plurality of communication schemes and a mode for performing transmission using only a single communication scheme. As a result, it is possible to perform communication using an appropriate communication scheme and transmission mode according to the quality of communication link that changes from moment to moment among communication schemes or the request of the user, so that it is possible to improve reliability of communication and overall transmission capacities.

Advantageous Effect of the Invention

According to the radio communication apparatus of the present invention, it is possible to carry out communication by selecting an appropriate communication scheme and transmission mode according to the quality of the communication link that changes from moment to moment among communication schemes, so that it is possible to improve reliability of communication and overall transmission capacities.

BRIEF DESCRIPTION OF DRAWINGS

FIG. 6 is a chart showing an example of the table for selecting a transmission mode according to Embodiment 1 of the present invention;

FIG. 10 is a chart illustrating an example of the conversion table for communication quality information according to Embodiment 1 of the present invention;

FIG. 12 is chart illustrating an example in the table for selecting a transmission mode according to Embodiment 2 of the present invention;

BEST MODE FOR CARRYING OUT THE INVENTION

Embodiments of the present invention will be described in detail below with reference to the accompanying drawings.

Embodiment 1

Figure 1:
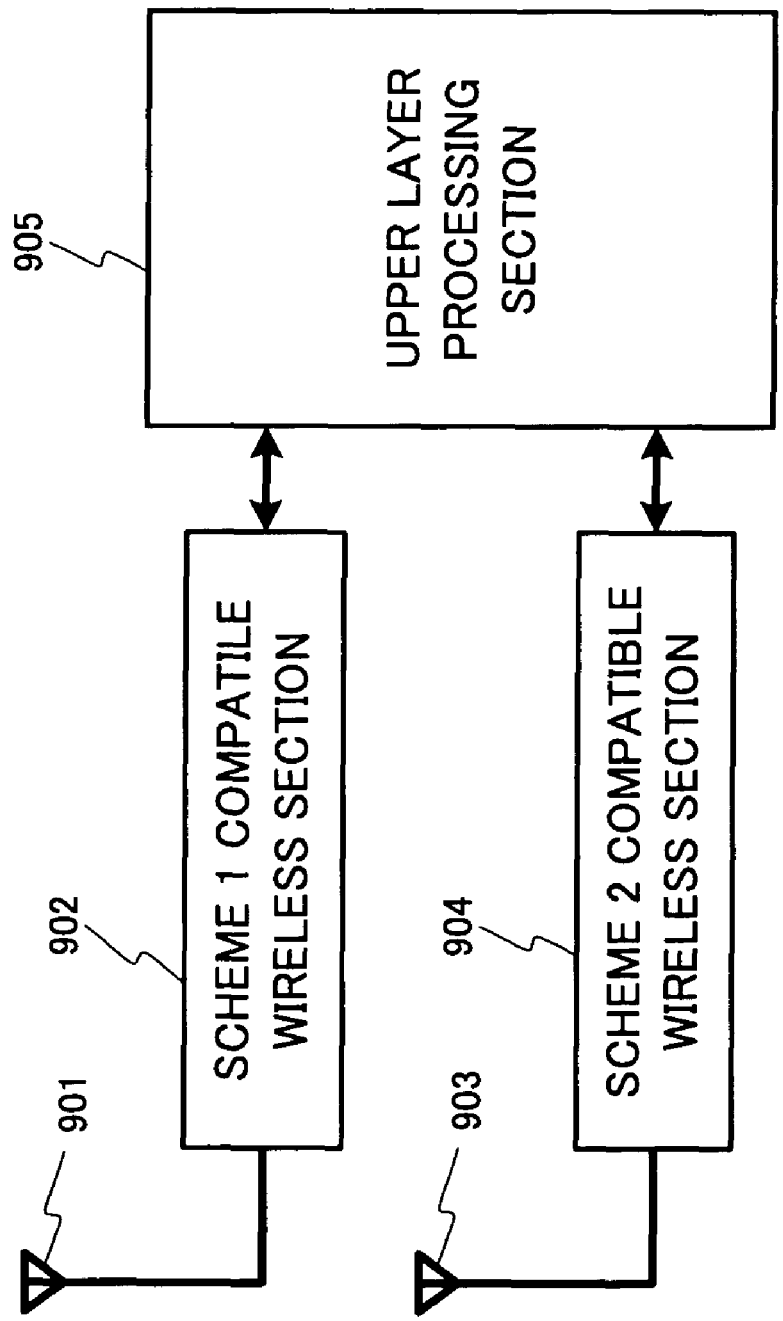
FIG. 1 is a block diagram showing a configuration example of the conventional multi-mode radio equipment.
Figure 2:
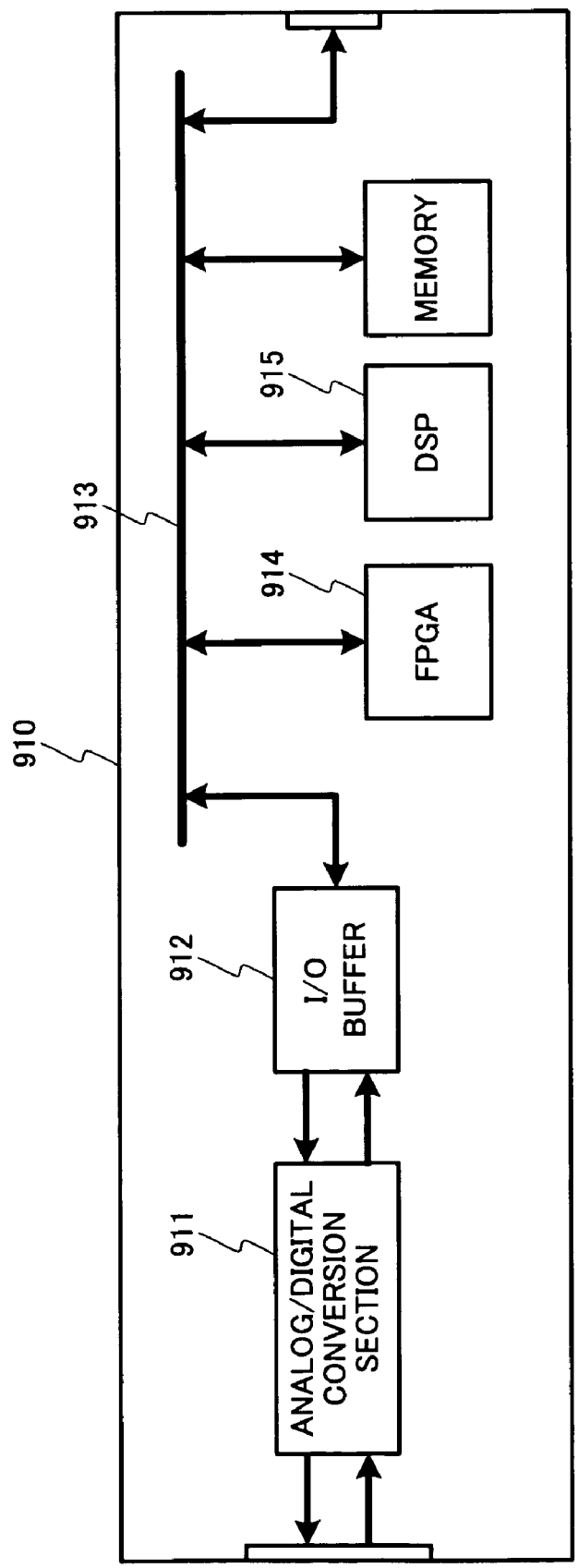
FIG. 2 is a block diagram showing a configuration example of conventional software radio equipment.
Figure 3:
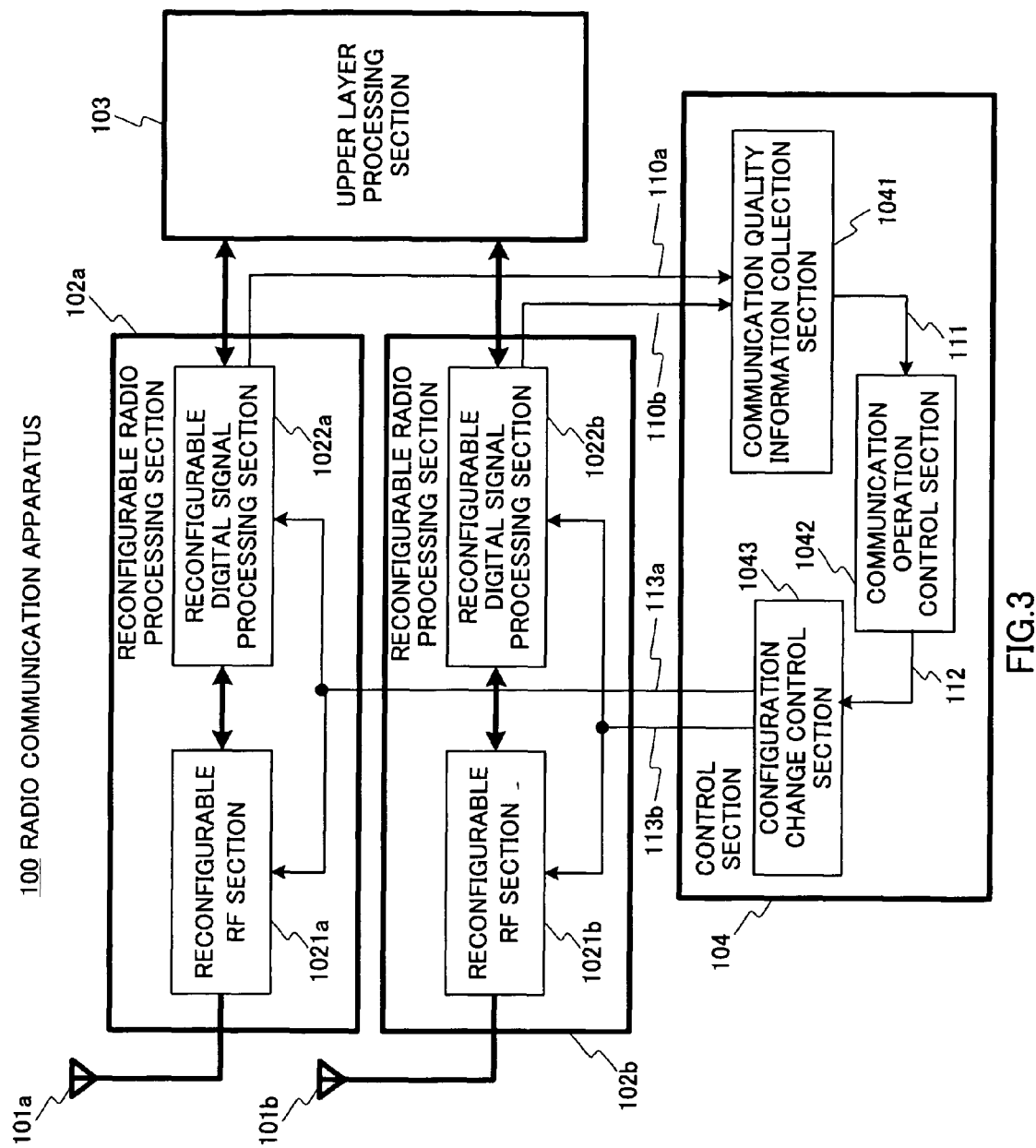
FIG. 3 is a block diagram showing a configuration example of a radio communication apparatus according to Embodiment 1 of the present invention.

FIG. 3 shows a configuration example of the radio communication apparatus according to Embodiment 1 of the present invention. Radio communication apparatus 100 is capable of supporting a plurality of communication schemes. One example of this embodiment is a radio communication apparatus capable of supporting both communication scheme A in a cellular system and communication scheme B in a wireless LAN system. As transmission rates in the communication schemes, it is assumed that a transmission rate of communication scheme B in the wireless LAN system is faster than that of communication scheme A in the cellular system.

In FIG. 3, antenna 101 (101a and 101b) receives radio signals transmitted via a radio propagation path, outputs the obtained high frequency signals, and radiates the high frequency signals supplied for transmission into the radio propagation path, and, in particular, is characterized in that it supports the RF frequency band that is used in a plurality of communication schemes. As a configuration of the antennas, it is possible to use antennas having wideband characteristics including all frequency band that is used in a plurality of the target communication schemes or multiple-resonance type antennas configured so that radiation efficiency is enhanced by lowering the voltage standing wave ratios with respect to respective frequency band that is used in a plurality of the target communication schemes. In addition, it is possible to use frequency control type antennas capable of adapting to a plurality of frequency band, that are configured by changing the electrical length of the antenna elements and resonance modes and controlling the resonance frequency using switches or variable capacity elements that can be electrically controlled, or by providing a plurality of antenna elements with different frequencies and switching the antenna elements using a switch. When the frequency control type antenna is used, a configuration in which control signal 113 for changing the supporting communication schemes that will be explained later is supplied to the antenna is used.

In reconfigurable radio processing section 102 (102*a* and 102*b*), the high frequency signals supplied from antenna 101 are inputted, desirable frequency bands are selectively amplified, desirable demodulation processing or decoding processing is carried out, the obtained reception data is outputted to upper layer processing section 103, and after desirable encoding processing or modulation processing for the data for transmission is carried out, the transmission high frequency signals obtained by performing frequency conversion and amplification to the desired frequency band are supplied to antenna 101. In addition, the functions and characteristics of reconfigurable radio processing section 102 can be changed according to control signal 113 (113*a* and 113*b*) for functional change.

The radio communication apparatus of the present invention is configured to have a plurality of radio processing systems including antenna 101 and reconfigurable radio processing section 102. That is, radio communication apparatus 100 has a plurality of antennas and a plurality of reconfigurable radio processing sections. In this embodiment, the case will be described as an example where two radio processing systems are provided. In FIG. 3, "a" is added at the end of reference numerals indicating components configuring a first system, and "b" is added at the end of reference numerals indicating components configuring a second system. Reconfigurable radio processing section 102 (102*a* and 102*b*) is configured with reconfigurable RF section 1021 and reconfigurable digital signal processing section 1022.

As reception processing, reconfigurable RF section 1021 receives high frequency signals supplied from antenna 101 as inputs, performs selective amplification and frequency conversion processing on the signals in desirable frequency band, and outputs the obtained signals. As transmission processing, reconfigurable RF section 1021 performs processing such as frequency conversion to the desirable frequency band, amplification and filtering on the modulation signals supplied from reconfigurable digital signal processing section 1022, and supplies the obtained transmission signals to antenna 101. In addition, reconfigurable RF section 1021 adopts a configuration where functions and characteristics can be changed according to control signal 113 for functional change. In this embodiment, as an example of the changeable functions, the carrier wave frequencies and conversion gain can be controlled according to the control signal.

Figure 4:
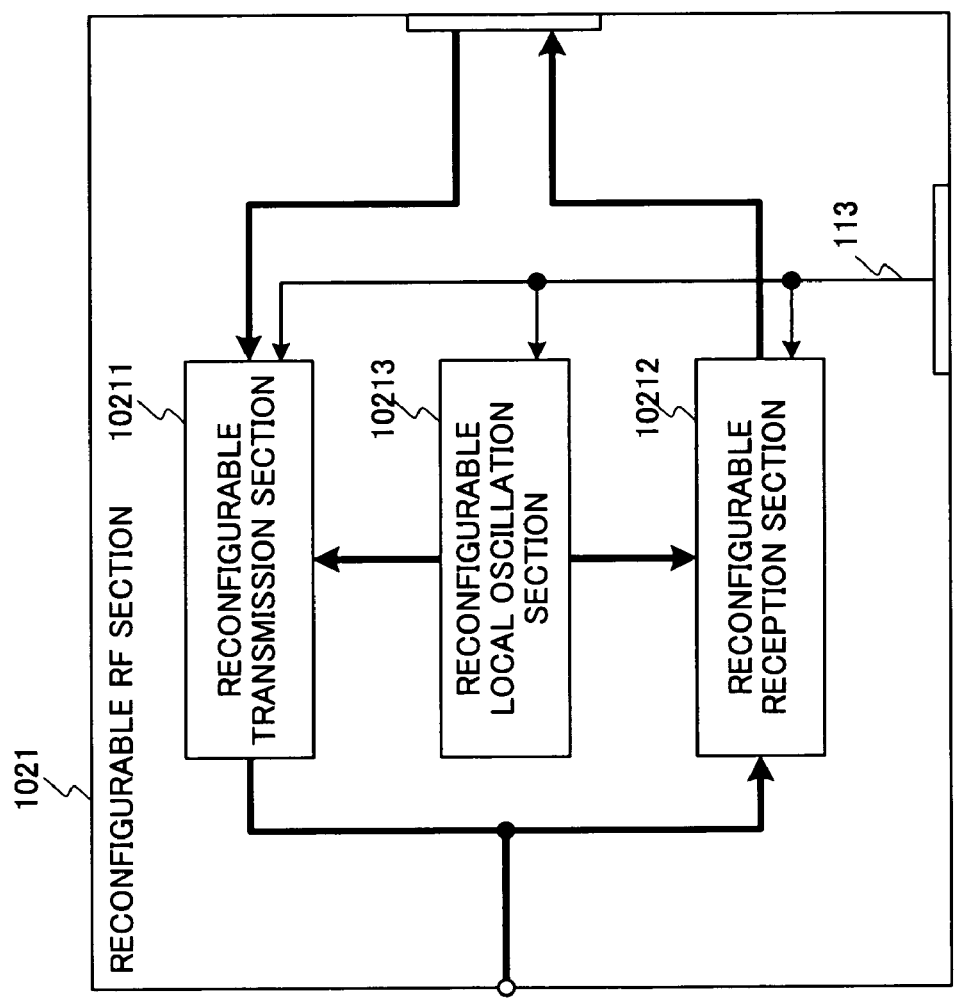
FIG. 4 is a block diagram showing a configuration example of a reconfigurable RF section.

FIG. 4 shows a configuration example of reconfigurable RF section 1021. Reconfigurable RF section 1021 is configured with reconfigurable transmission section 10211, reconfigurable reception section 10212 and reconfigurable local oscillation section 10213.

Reconfigurable transmission section 10211 plays the role of converting the modulation signals supplied from reconfigurable digital signal processing section 1022 to the high frequency signals to be radiated from antenna 101, and has a function of converting frequencies from the modulation signals of the baseband to high frequency signals and amplifying them to the transmission signal levels. Moreover, reconfigurable transmission section 10211 adopts a configuration where the functions and characteristics can be changed according to control signal 113 for functional change. Generally, in radio systems such as cellular and wireless LAN, items such as the communication scheme to be used, frequency band and transmission power are restricted by the Radio Law and standard specifications. In reconfigurable transmission section 10211, the frequency band of the high frequency signals and transmission power can be controlled by control signal 113, and reconfigurable transmission section 10211 adopts a configuration capable of changing to a processing system supporting communication scheme A or communication scheme B. Thus, transmission signals can be formed in compliance with various radio laws and standard specifications. Although the allowable performance characteristics such as modulation accuracy, amount of spurious radiation and amount of adjacent channel leakage power may vary according to communication standard, the characteristics can be adapted by optimally adjusting the operation of the circuits of the components using control signal 113. The components in reconfigurable transmission section 10211 include circuits such as power amplifiers, up-converters, filters and modulators. Reconfigurable transmission section 10211 can optimize the characteristics by adjusting the operation points by changing the impedance of the elements in these circuits and biases of active devices according to control signal 113, or by arranging a plurality of circuits optimized for each of communication schemes in parallel and performing switching, or by adopting a configuration of combining these.

Reconfigurable reception section 10212 converts high frequency signals supplied from antenna 101 to analog signals with lower frequency that can be processed by reconfigurable digital signal processing section 1022, and has functions of converting frequencies from high frequency signals to baseband analog signals, synchronization/selection of carrier wave frequencies, and amplification of weak received signals. Moreover, reconfigurable reception section 10212 adopts a configuration where functions and characteristics can be changed according to control signal 113 for functional change. Generally, the levels of the received signals are not always constant and may change significantly due to factors such as distance between the reception places and the communication targets and the presence/absence of movement, and the changes vary according to the used radio system. Reconfigurable reception section 10212 adopts a configuration where the conversion frequencies and conversion gain etc. upon conversion from the received high frequency signals to the frequencies and signal levels that can be processed by reconfigurable digital signal processing section 1022, can be controlled by control signal 113, and can be changed to a processing system supporting communication scheme A or communication scheme B. Thus, it is possible to carry out processing adapting to a plurality of radio systems. In addition, generally, in the radio systems such as cellular and wireless LAN, the specifications such as the dynamic range of the received signals and allowable interference signal levels that can be dealt with are specified by the standard specifications, and these characteristic values can be adapted by optimally adjusting the operation of the circuits that are the components using control signal 113. The components in reconfigurable reception section 10212 include circuits such as low noise amplifiers, down-converters, filters and demodulators. Reconfigurable transmission section 10212 can optimize the characteristics by adjusting the operation points by changing the impedance of the elements in these circuits, the synchronous frequencies of the filters and the biases of active devices according to control signal 113, or by arranging a plurality of circuits optimized for communication schemes in parallel and performing switching, or by adopting a configuration of combining these.

Reconfigurable local oscillation section 10213 has a function of generating local oscillation signals with frequencies and signal levels necessary for frequency conversion in reconfigurable transmission section 10211 and reconfigurable reception section 10212. Moreover, reconfigurable local oscillation section 10213 adopts a configuration where the functions and characteristics can be changed according to control signal 113 for functional change. The components in reconfigurable local oscillation section 10213 are standard oscillators such as high stable crystal oscillators and oscillators with variable frequencies, circuits such as phase synchronized circuits and amplifiers. In reconfigurable transmission section 10211 and reconfigurable reception section 10212, the up converter and down converter for frequency conversion are generally configured with mixer circuits, and require local oscillation signals that primarily consist of the frequency components of the sum or difference of the signals before and after the conversion. In the radio systems such as cellular and wireless LAN, applicable carrier wave frequencies are different and have a wide range from the UHF band to microwave band. Reconfigurable local oscillation section 10213 is configured to be capable of setting the frequencies of the local oscillation signals over a wide range by control signal 113, and adapting to the processing system supporting communication scheme A or communication scheme B. Thus, it is possible to form local oscillation signals supporting a plurality of communication schemes. In reconfigurable transmission section 10211 and reconfigurable reception section 10212, as a method of converting frequencies between the high frequency signals radiated from antenna 101 and the analog signals processed in reconfigurable digital signal processing section 1022, typically, there are a direct conversion scheme for direct conversion and a superheterodyne scheme for converting frequencies several times via intermediate frequencies. The former requires local oscillation signals having the same frequency components as that of the carrier wave frequencies, and the latter requires a plurality of different local oscillation signals. In the configuration using a orthogonal mixer, in order to obtain signals having a phase difference of 90 degrees, local oscillation signals having two to four times greater frequency components may be required compared to the frequency required for frequency conversion of the orthogonal mixer. As mentioned above, it is necessary to generate wideband local oscillation signals. Reconfigurable local oscillation section 10213 can form local oscillation signals by adjusting the operation points by changing the element values of the resonance elements configuring the oscillator and the biases of the active devices, etc. according to control signal 113, or by using multiply circuits or division circuits, or by dividing the desirable oscillation frequency band into a plurality of numbers, or by arranging the plurality of oscillation circuits optimized for frequency band in parallel and performing switching, or by adopting a configuration of combining these. In reconfigurable local oscillation section 10213, it is possible to optimize characteristics also for the characteristics requirement such as phase noise that is different according to communication schemes by controlling the loop filter constant in the phase synchronized circuit in addition to the adjustment of the oscillator.

As reception processing, reconfigurable digital signal processing section 1022 (1022a and 1022b) quantizes inputted modulation signals and converts the signals into digital signals, performs digital signal processing such as demodulation processing and decoding processing supporting a predetermined scheme, outputs the obtained reception data to upper layer processing section 103, and outputs received signals 110 required for collecting reception quality to control section 104. In addition, as transmission processing, reconfigurable digital signal processing section 1022 performs encoding processing and modulation processing supporting the predetermined scheme for the inputted transmission data, converts the obtained digital modulation signals to analog signals, and outputs the signals to reconfigurable RF section 1021. Moreover, reconfigurable digital signal processing section 1022 adopts a configuration where functions and characteristics can be changed according to control signal 113 for functional change. In this embodiment, as an example of the changeable functions, it is assumed to adopt a configuration where the modulation schemes and encoding schemes upon transmission/reception processing, associated interleave and scramble processing, and sampling rates in analog/digital conversion, can be changed according to the control signal.

Figure 5:
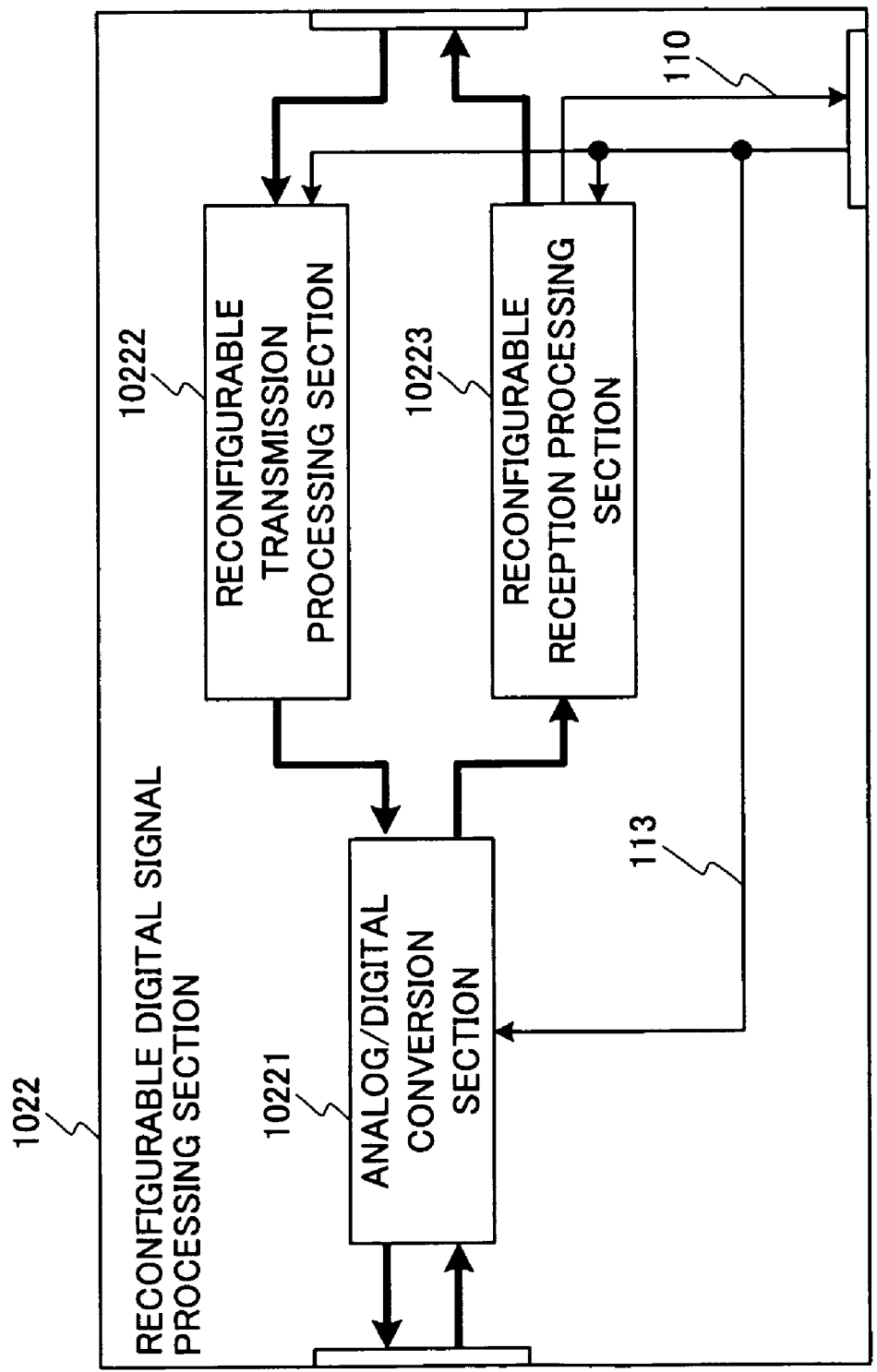
FIG. 5 a block diagram showing a configuration example of a reconfigurable digital signal processing section.

FIG. 5 shows a configuration example of reconfigurable digital signal processing section 1022. Reconfigurable digital signal processing section 1022 is configured with analog/digital conversion section 10221, reconfigurable transmission processing section 10221 and reconfigurable reception processing section 10223.

Upon reception, analog/digital conversion section 10221 quantizes the received analog signals supplied from reconfigurable RF section 1021 at a predetermined number of quantization bits and sampling rate, and outputs the obtained digital signals to reconfigurable reception processing section 10223. In contrast, upon transmission, analog/digital conversion section 10221 converts the digital modulation signals supplied from reconfigurable transmission processing section 10222 to analog signals at a predetermined number of bits and sampling rate, and outputs the transmission analog signals to reconfigurable RF section 1021.

Reconfigurable transmission processing section 10222 performs encoding processing and modulation processing supporting the predetermined scheme on the inputted transmission data and supplies the obtained digital signals to analog/digital conversion section 10221. Moreover, reconfigurable transmission processing section 10222 adopts a configuration where functions and characteristics can be changed according to control signal 113 for functional change. In this embodiment, as an example of changeable functions, it is assumed to adopt a configuration where the modulation scheme, encoding scheme upon transmission processing, and associated interleave and scrambling processing scheme can be changed to a processing system supporting communication scheme A or communication scheme B according to the contents of control signal 113.

Reconfigurable reception processing section 10223 performs digital signal processing such as modulation processing and decoding processing supporting a predetermined scheme on the inputted digital signals, outputs the obtained reception data to upper layer processing section 103, and outputs received signal 110 that is necessary for collecting reception quality to control section 104. Moreover, reconfigurable reception processing section 10223 adopts a configuration where functions and characteristics can be changed according to control signal 113 for functional change. In this embodiment, as an example of changeable functions, it is assumed to adopt a configuration where the modulation scheme, encoding scheme and associated interleave and scrambling processing scheme upon reception processing can be changed to a processing system supporting communication scheme A or communication scheme B according to the contents of control signal 113.

In this embodiment, each of reconfigurable transmission processing section 10222 and reconfigurable reception processing section 10223 is, for example, configured with a FPGA device. The configuration and operation contents can be changed by rewriting the set data describing the configuration of the internal circuits.

Upon transmission, upper layer processing section 103 generates data to be transmitted to the communicating party station and supplies the data to a plurality of reconfigurable radio processing sections 102. In addition, upper layer processing section 103 inputs the reception data outputted from the plurality of reconfigurable radio processing sections 102, and performs processing in the upper layer such as processing in corresponding application. Upper layer processing section 103 is configured with, for example, a general-purpose processor such as a CPU.

Control section 104 determines a communication scheme that should be supported in the systems of each of reconfigurable radio processing sections 102 and transmission mode based on information 110 (110a and 110b) concerning the communication link quality obtained respectively from a plurality of reconfigurable radio processing sections 102 (102a and 102b) and outputs control signal 113 (113a and 113b) for functional change to each of reconfigurable radio processing sections 102. In this embodiment, control section 104 is configured with communication quality information collection section 1041, communication operation control section 1042 and configuration control section 1043.

Communication quality information collection section 1041 collects the information concerning the communication link quality in each system using signals 110 (110a and 110b) obtained upon each reception demodulation processing in each of a plurality of reconfigurable radio processing sections 102 and outputs the collected communication quality information 111 to communication operation control section 1042. In this embodiment, communication quality information collection section 1041 detects whether or not there is a target communication scheme using the orthogonal demodulation signals obtained in each of reconfigurable radio processing sections 102 (102a and 102b) as received signal 110, and, when there is a system, estimates a reception CNR (carrier to noise ratio) value as the communication quality information. As for the method of estimating the reception CNR value, it is not particularly limited in the present invention, but the following methods are applicable: a method of calculating from the ratio between the power values of the average signal point vector of the signal point vectors obtained as the reception results and the variance values of each vector using the average signal point vector as a reference; and a method of estimating an equivalent reception CNR value from the metric values in the scheme where a maximum likelihood sequence estimation or maximum likelihood decoding are performed.

Communication operation control section 1042 selects a communication scheme that should be supported by each of reconfigurable radio processing sections 102 and transmission mode in the scheme based on communication quality information 111, and outputs selection result 112. The specific selection conditions and example procedures will be described later.

Configuration control section 1043 outputs control signal 113 (113a and 113b) for changing functions of each component in reconfigurable radio processing section 102 based on selection result 112 of the communication scheme and transmission mode outputted from communication operation control section 1042. In this embodiment, reconfigurable radio processing section 102 is configured to be capable of supporting communication scheme A in a cellular system and communication scheme B in a wireless LAN system, so that control signal 113 indicating which communication scheme reconfigurable radio processing section 102 should be switched to is outputted from configuration control section 1043.

As a result, in radio communication apparatus 100, according to functions changed to support one of communication schemes, each of reconfigurable radio processing sections 102 selectively sets one transmission mode out of the plurality of transmission modes as shown in FIG. 6. Thus, in radio communication apparatus 100, an optimal transmission mode can be selected according to the radio wave propagation environment, etc. among the plurality of transmission modes. The details of each transmission mode shown in FIG. 6 will be described later.

An operation example of performing communication of desirable application data using communication scheme A and communication scheme B with radio communication apparatus 100 having the above-described configuration, will be explained below with respect to three stages: upon start up of the apparatus, during the communication standby period, and during the communication.

Figure 7:
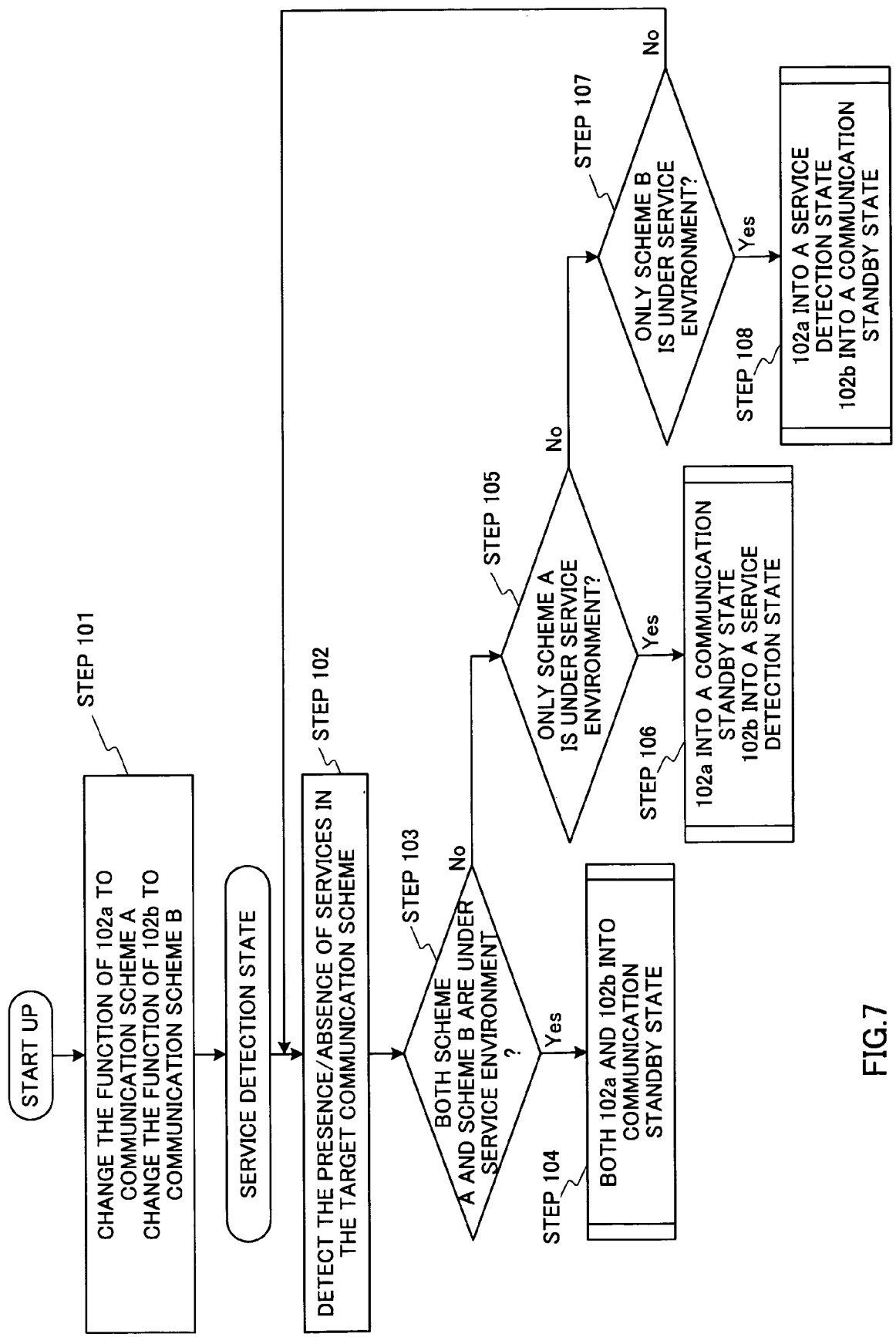
FIG. 7 is a flowchart showing an example of the operation procedure upon start up and during the period of communication standby of the radio communication apparatus according to Embodiment 1 of the present invention.

FIG. 7 is a flowchart showing an example of operation procedure upon start up and during the communication standby period after the power source is turned on in radio communication apparatus 100. When the power source is turned on in the apparatus, the function of reconfigurable radio processing section 102a is set to support communication scheme A based on control signal 113a from control section 104, and the function of reconfigurable radio processing section 102b is set to support communication scheme B based on control signal 113b from control section 104 (Step 101). In the radio processing system of each of reconfigurable radio processing sections 102a and 102b, it is detected whether or not it is under the service environment of the respective communication schemes (Step 102). Based on the detection results, the operation during the communication standby period is determined as follows. In the case where services of both of the communication schemes are detected (Step 103), the operation shifts to a communication standby state for both of the communication schemes (Step 104). In the case where one of the services of the communication schemes is detected (Steps 105 and 107), the operation shifts to a communication standby state for the detected communication scheme, and a communication scheme is continuously detected periodically for the undetected communication scheme (Steps 106 and 108). In the case where the presence of neither of the communication schemes can be detected, both communication schemes are continuously detected periodically (Step 107). In this case, in order to reduce power consumption of the apparatus, detection operation of the communication schemes can be executed by operating only one of the reconfigurable radio processing sections and switching functions periodically between communication scheme A and communication scheme B.

Figure 8:
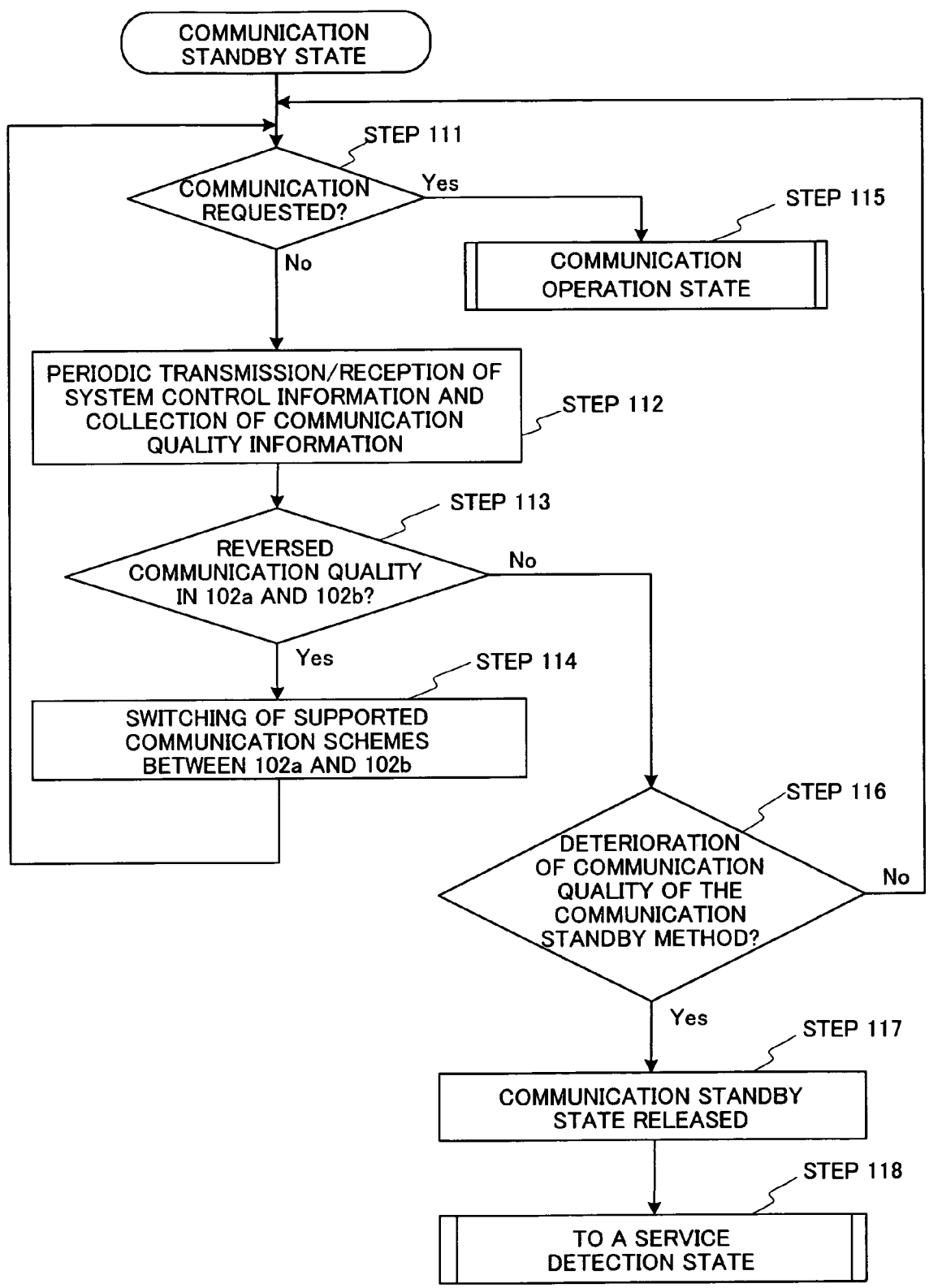
FIG. 8 is a flowchart showing an example of the operation procedure during the period of communication standby of the radio communication apparatus according to Embodiment 1 of the present invention.

FIG. 8 is a flowchart showing an example of the operational procedure during the communication standby period. Each operation will be explained in the order it is operated.

During the communication standby period, the presence/absence of a communication request is detected by detecting whether or not there is a communication request from another station or whether or not a communication request to another station is generated in the upper layer processing section at the station. When a communication request is detected, the operation shifts to a communication operation state (Step 115), and when a communication is not detected, the operation shifts to Step 112 (Step 111). At Step 112, according to the predetermined method in the communication scheme that has become the standby target, transmission/reception of system control information and collection of communication quality information 111 are performed periodically. In this case, Step 111 and Step 112 are expressed vertically, but it is not always necessary that both steps be executed vertically. They can be executed in parallel to each other or at a different cycle. For example, under such conditions that transmission/reception of system control information for communication scheme A is executed only part of the time by intermittent operation in reconfigurable radio processing section 102a, the functions of reconfigurable radio processing section 102a are periodically changed to support communication scheme B, and the communication link quality for communication scheme B can be monitored. It is determined whether or not the communication link quality between the supported communication schemes is reversed in each of reconfigurable radio processing sections 102a and 102b (Step 113), and in the case of a reversed state, the communication schemes that should be supported are reversed in each of reconfigurable radio processing sections 102a and 102b. That is, communication standby operation for communication scheme B is executed in reconfigurable radio processing section 102a, and communication standby operation for communication scheme A is changed so that it can be operated in the other reconfigurable radio processing section 102b, and thereby operation is performed to maintain the communication link quality during the communication standby period (Step 114).

In addition, based on periodically collected communication quality information 111 in the communication scheme that is the standby target, it is determined whether or not the communication quality is in an adequate state for maintaining the communication link for transmission/reception of the system control information (Step 116). In the case where maintenance of the link is not possible due to quality deterioration, the communication standby state in the communication scheme is released (Step 117), and the operation shifts to a service detection state (Step 118). In this case, the operation for the service detection state (step 118) is equivalent to the processing after Step 102 in FIG. 7.

For example, when radio communication apparatus 100 is in the service areas of only communication scheme A and is in standby operation, the system of reconfigurable radio processing section 102a with functions set in communication scheme A that is the communication standby target performs periodically a series of communication standby operation from Step 111 through Step 117 for communication scheme A and, performs the transmission/reception of the system control information periodically as necessary. On the other hand, in the system of reconfigurable radio processing section 102b with functions set in communication scheme B that is not the communication standby target, it is periodically detected whether or not there is service for communication scheme B. If the quality of the communication link with communication scheme A in reconfigurable radio processing section 102a deteriorates, reconfigurable radio processing section 102b changes the function of the radio processing section so as to support communication scheme A only at the timing of the communication standby operation with communication scheme A, and receives the signals for communication standby operation of communication scheme A, performs reception diversity operation between reconfigurable radio processing sections 102a and 102b, and thereby communication quality is improved. Alternatively, in the case where the communication link quality with communication scheme A in reconfigurable radio processing section 102b becomes better than that in reconfigurable radio processing section 102a, the communication standby operation with communication scheme A is performed by reconfigurable radio processing section 102b, so that the detection operation of whether or not there is communication scheme B is periodically performed in reconfigurable radio processing section 102a.

In the case where the communication standby is operated within the service area of only communication scheme B, communication scheme A can be replaced by B in the above-described operation explanation, and reconfigurable radio processing section 102a can be replaced by 102b.

Figure 9:
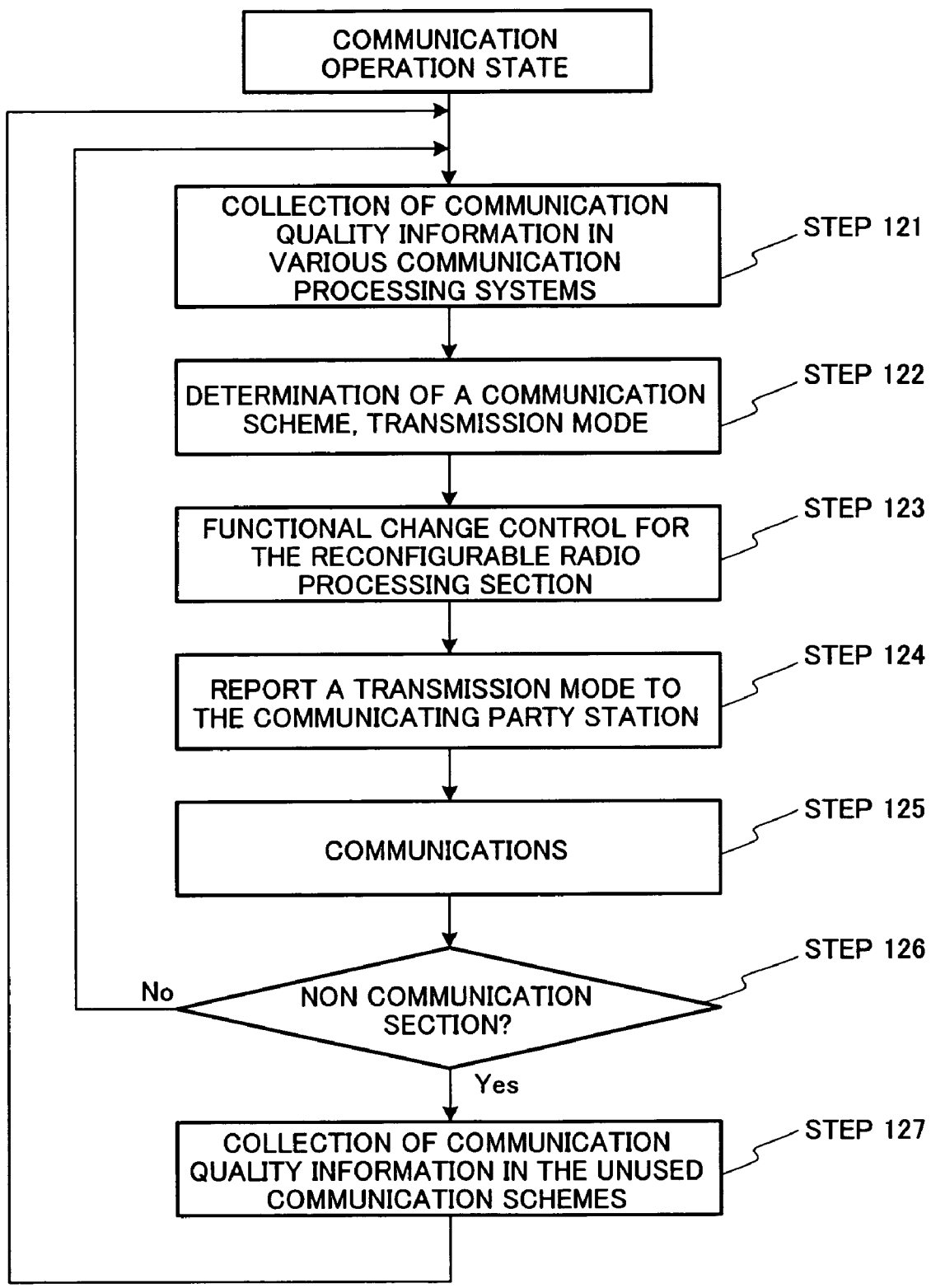
FIG. 9 is a flowchart showing an example of the operation procedure in a communication operating state of the radio communication apparatus according to Embodiment 1 of the present invention.

Next, an example of the operation procedure will be described for the case where the communication request is detected in the communication standby state and the operation shifts to a communication operation control state. In this embodiment, as an operation mode for performing data communication between another station and the station, the case will be described where communication control is performed using a plurality of communication links by a plurality of communication schemes in parallel. FIG. 9 is a flowchart showing an example of the communication control procedure in the communication operation state. With reference to this flowchart, under the conditions in which a communication link is established between reconfigurable radio processing section 102a and communication scheme A, and a communication link is also established between reconfigurable radio processing section 102b and communication scheme B, the operation for controlling the communication schemes and transmission modes that should be supported in reconfigurable radio processing section 102a and 102b will be described respectively based on the quality of both the communication links. Specifically, the operation will be described where a transmission mode for performing diversity transmission operation among the communication schemes according to the quality of each communication link, a transmission mode for performing diversity transmission operation in one of the communication schemes, and a transmission mode for performing MIMO channel transmission operation are adaptively controlled according to the situation of the communication links. Here, the MIMO channel transmission means a transmission scheme in which a plurality of communication data series are multiplexed and transmitted using a plurality of radio processing systems at both the transmitting side and receiving side, that is, a transmission scheme of performing transmission by space multiplexing or time space multiplexing, estimating the condition of the propagation path multiplexed at the receiving side, separating a plurality of the multiplexed data series based on the obtained propagation path characteristics and obtaining the reception data.

Reconfigurable radio processing section 102a performs predetermined signal processing on the signals transmitted to the station with a predetermined scheme of communication scheme A and obtains a reception demodulation result. Also, reconfigurable radio processing section 102b performs predetermined signal processing on the signals transmitted to the station with a predetermined scheme of communication scheme B and obtains a reception demodulation result.

Communication quality information collection section 1041 estimates the reception CNR values in each system using received signals 110a and 110b of the communication schemes supported by both sections obtained from each of reconfigurable radio processing sections 102a and 102b, and determines the communication quality based on the estimation results (Step 121). In this embodiment, the communication quality is determined using the determination table shown in FIG. 10. That is, the quality of received signals is classified into four kinds in the descending order of the quality "Good">"Fair">"Poor">"Failed", and one of these is outputted as a parameter of communication quality information. For example, in the case where the reception CNR value for scheme A is higher by 10 dB than the sensitivity point level (SL_A) in scheme A, the communication quality is expressed as "Fair". Communication quality information 111 obtained for each communication scheme is supplied to communication operation control section 1042.

In communication operation control section 1042, based on the inputted communication quality information 111, communication schemes and transmission modes that should be supported by each of reconfigurable radio processing sections 102a and 102b are selected at a predetermined time interval and selection result 112 is reported to configuration control section 1043 (Step 122). An example of the communication schemes and transmission modes selected in communication operation control section 1042 is shown in FIG. 6.

Using the selection table in FIG. 6, the operation in each transmission mode will be explained below.

If the communication quality in communication scheme B that has a higher transmission rate than communication scheme A is "Good", a transmission mode for performing multiple transmission using the MIMO channel is selected in communication scheme B by making both reconfigurable radio processing sections 102b and 102b support communication scheme B. Thus, in the case of the configuration of the radio communication apparatus as in this embodiment where two radio processing systems are provided at both the transmitting side and the receiving side, it is possible to obtain a transmission rate of two times at maximum compared to the case where transmission is performed using only a single system. That is, it is possible to multiplex different transmission data on the transmission path, transmit the data in parallel, estimate the transmission path characteristics from each transmission system to each reception system at the receiving side, and separate the transmission signals based on the obtained estimated results of the transmission path, using the same communication scheme in each system, so that it is possible to obtain the transmission rate of two times at maximum compared to the case where the data is transmitted in a single system. With respect to the details of the transmission method using the MIMO channel, it is not particularly limited in the present invention. For example, it is possible to use a transmission method by space multiplexing and time space multiplexing in the MIMO channel as disclosed in "Introduction to Space Time Wireless Communications" by Arogyaswami Paulraj, et al. Even while the MIMO channel transmission is performed as described above, for example, by controlling the configuration of reconfigurable radio processing section 102a periodically so as to support communication scheme A, it is possible to monitor the communication quality of communication scheme A.

If the communication quality in communication scheme A is in a state of "Good" or "Fair" and the communication quality in communication scheme B is in a state of "Fair" or "Poor", the communication links are configured in both communication scheme A and communication scheme B, and a mode for performing diversity communication between the schemes is selected, reconfigurable radio processing section 102a is made to support communication scheme A, and reconfigurable radio processing section 102b is made to support communication scheme B. As a specific example of the transmission scheme using diversity between the schemes, there is a case where the data to be transmitted is configured on a packet basis in the IP layer or upper layer, and the number of packets to be transmitted is distributed and transmitted according to the transmission rate at each communication link. In this case, it is possible to increase the transmission rate up to the sum of the transmission rates of both of the communication links. If there is a difference in terms of the degree of significance in the data to be transmitted in the upper layer (for example, application layer), a communication link for transmission can be selected according to the degree of significance.

If the communication quality in communication scheme A is "Good" and the communication quality in communication scheme B is "Failed", both reconfigurable radio processing sections 102a and 102b are made to support communication scheme A, and a mode of performing multiplex transmission using the MIMO channel in communication scheme A is selected.

If the communication quality in communication scheme A is "Fair" and the communication quality in communication scheme B is "Poor", only reconfigurable radio processing section 102a is used and a mode of performing communication only in communication scheme A is selected. In reverse, if the communication quality in communication scheme A is "Poor" or less and the communication quality in communication scheme B is "Fair", only reconfigurable radio processing section 102b is used and a mode of performing the communication only in communication scheme B is selected. In the case where a transmission mode in only one communication scheme is selected (for example, in the case of performing communication using only communication scheme A in reconfigurable radio communication processing 102a), using a system in which communication is not operated (reconfigurable radio processing section 102b), the communication quality of the scheme that is not used for communication (communication scheme B) is measured periodically, and based on the information, the transmission mode is determined again after a predetermined time. The measurement of the communication quality in the communication scheme that is not used for communication is not necessary to be carried out in reconfigurable radio processing section 102b. If the communication is performed intermittently in communication scheme A by reconfigurable radio processing section 102a, it is possible to adopt a configuration of reconfiguring the configuration of reconfigurable radio processing section 102a to be used in communication scheme B while this communication is not in an active state, and measuring the communication quality in communication scheme B.

If the communication quality in communication scheme A is "Poor" and the communication quality in communication scheme B is "Failed", both the reconfigurable radio processing sections 102a and 102b are controlled to support communication scheme A, and a transmission mode by a so-called diversity transmission/reception is selected. That is, upon reception, the signals transmitted to the station in communication scheme A are received in both systems, and the reception results in the systems with better reception quality are selected. Alternatively, the reception results in both systems are combined to obtain reception results. Upon transmission, the same transmission data is subjected to transmission processing using both systems.

In reverse, if the communication quality in communication scheme A is worse than "Poor", and the communication quality in communication scheme B is "Poor", both radio processing sections 102a and 102b are controlled to support communication scheme B, and a transmission mode of transmitting and receiving by diversity the signals transmitted to the station in communication scheme B is selected.

Lastly, if the communication quality in both communication scheme A and communication scheme B is "Failed", a standby mode is selected for data transmission operation until the quality of one of the communication scheme is improved.

The communication schemes and transmission modes are selected based on the selection conditions as described above at a predetermined time interval, and selection result 112 is reported to configuration control section 1043.

Configuration control section 1043 outputs control signal 113 (113a and 113b) for configuring the functions in the communication processing in reconfigurable radio processing sections 102a and 102b based on selection result 112 of the transmission modes (Step 123). Specifically, the control signal supporting either of communication scheme A or communication scheme B is output and accordingly, setting of the carrier wave frequencies to be transmitted and received and the transmitting power is changed in reconfigurable RF sections 1021a and 1021b, setting such as modulation scheme or encoding scheme, associated interleave or scrambling processing, and sampling rate in analog/digital conversion is changed in reconfigurable digital signal processing sections 1022a and 1022b.

Reconfigurable radio processing sections 102a and 102b are subjected to functional change for communication in the selected communication schemes and transmission modes. In addition, information concerning the selected communication scheme and transmission modes is reported to the transmission station side of each communication scheme by reconfigurable radio processing sections 102a and 102b where functions have been changed (Step 124). In response to the transmission modes selected at the communicating party station side, transmission/reception processing is performed between the communicating party station and radio communication apparatus 100 (Step 125). For example, in the case of a diversity transmission/reception mode among a plurality of communication schemes as a transmission mode, both of the communication schemes collaborate on the network and perform data transmission. In this case, transmission/reception by both of the communication schemes at the communicating party station is not always necessary to be carried out in the same radio communication apparatus. For example, it is possible to perform communication using different radio communication apparatuses via a network, etc.

When the presence of a segment where transmission/reception in the predetermined transmission mode is not performed with the communicating party station is detected (Step 126), it is possible to change functions to the communication schemes that are not used in the current transmission mode in reconfigurable radio processing sections 102a and 102b and acquire the information concerning the communication quality.

According to the embodiment of the present invention as described above, by adopting a configuration having a plurality of antennas, a plurality of reconfigurable radio processing sections, and a control section that controls independently each of the plurality of the reconfigurable radio processing sections and switches independently the processing contents in each reconfigurable radio processing section, and by appropriately changing the processing contents of the reconfigurable radio processing section based on the communication quality information obtained in each reconfigurable radio processing section, it is possible to appropriately select a desirable transmission mode from a plurality of modes such as a mode for performing diversity transmission and reception using only a single communication scheme, a mode for performing space multiplexing transmission using a MIMO channel, a mode for performing diversity transmission among the plurality of communication schemes, or a mode for performing transmission using only a single communication scheme, and perform communication in a single radio communication apparatus. As a result, according to the quality of communication links that changes from moment to moment between communication schemes, it is possible to perform communication in an appropriate transmission mode from selective options of transmission modes in a wider range compared to the conventional apparatus, so that it is possible to improve reliability of communication and the overall transmission capacities.

Accordingly, there is such an effect that a synthesis processing at the stage of signal data in the physical layer as in the maximum ratio combining method can be easily executed for the received signals obtained from a plurality of systems using diversity transmission among a plurality of transmission modes.

According to this embodiment of the present invention, as information concerning the quality of communication links in each radio processing system collected in communication quality information collection section 1041, a configuration has been adopted where the quality level that is divided into four stages based on the determination table as shown in FIG. 10 is used based on the reception CNR values obtained from the estimated reception CNR values in each system. However, the present invention is not always limited by this configuration. For example, the appropriate values of the specific threshold values for the reception CNR values in the determination table shown in FIG. 10 are different according to the target communication schemes, and therefore it is possible to use different values according to the applied communication scheme. In addition, classification of quality is not always necessary to be based on four stages. For example, classification can be made based on three stages or less or based on five stages or more if necessary. In this case, the transmission mode selection table should be revised according to the classification. Furthermore, other parameters can be used instead of estimating the reception CNR values. In this case, a determination table which is equivalent to that shown in FIG. 10 may be provided for the parameters to be used. For example, it is possible to adopt a configuration where the bit error rate or frame erasure rate of the reception data is measured or estimated as a different parameter, or parameters such as CIR (ratio of carrier wave power to interference wave component power) are used as parameters including interference.

Further, the modes shown in the table in FIG. 6 have been provided as candidates for transmission modes to be selected in communication operation control section 1042. However, it is not always necessary to support all the listed transmission modes, and it is possible to change the contents of the transmission modes to be applied according to the target communication schemes and requirements. For example, the effect of the present invention can be expected even though a part of the transmission modes are omitted from the selection options. Also, it is also possible to perform control using a table in which a part of the transmission modes to be selected is replaced with other transmission modes. For example, in the table shown in FIG. 6, under the condition where the quality in communication scheme A is "Good", and the quality in communication scheme B is "Failed", it is possible to omit the MIMO transmission mode in the selected communication scheme A and control to select a transmission mode of performing communication using only communication scheme A, instead. Moreover, it is also possible to apply a new transmission mode that is not listed in FIG. 6. For example, by providing a transmission mode for performing directivity control of the antennas using a plurality of radio processing systems as a new transmission mode, under the condition where the communication quality of both communication schemes A and B is "Poor" or "Failed", it is possible to control communication so as to improve the reliability of the communication by the gain improvement effect due to the directivity control and by the effect of suppressing interference components. In the case of a system in which a so-called adaptive modulation scheme is adopted to adaptively control the modulation scheme in the target communication scheme, when communication is carried out in a transmission mode using only one of the communication schemes shown in FIG. 6, it is possible to obtain the same effect by performing directivity control using the radio processing system that is not used and improve the transmission rate by selecting a more efficient modulation scheme.

Among the transmission modes shown in FIG. 6, as a specific operation example for the case of a diversity transmission mode, a so-called space diversity transmission for performing transmission/reception using a plurality of radio processing systems in the radio communication apparatus has been explained. However, the present invention is not limited to the space diversity transmission. For example, a transmission method combining time diversity and site diversity can be applied.

When a MIMO transmission mode or a diversity transmission mode is selected, post-processing such as separation processing for the multiplexed signals by MIMO using the received signals received in each radio processing system, and synthesis processing for the received signals for each branch transmitted by diversity is required. In addition, upon transmission in a MIMO transmission mode, pre-processing such as division of the transmission data for a plurality of radio processing systems is required. Where the processing should be performed is not the essential part of the present invention, but for example, processing can be performed in upper layer processing section 103. Further, for example, it is possible to adopt a configuration where pre-processing is performed in reconfigurable radio processing section 102a, and reconfigurable radio processing section 102b performs the post-processing using the pre-processing results and the pre-processing results of reconfigurable radio processing section 102b.

In reconfigurable digital signal processing sections 1022a and 1022b, sampling rates, modulation schemes and encoding schemes upon transmission and reception have been described as examples of functions which can be changed according to the control signal. However, the present invention is not limited to these examples. For example, it is possible to adopt a configuration where the number of quantization bits in the analog/digital conversion section is changed and change parameters concerning the filter characteristics such as tap coefficients when digital filter processing is performed. In addition, error control schemes by equalization processing and re-transmission can be changed.

Reconfigurable transmission processing section 10222 and reconfigurable reception processing section 10223 have been configured using the FPGA apparatuses, but the present invention is not limited to this configuration. For example, by using DSP apparatuses and CPU apparatuses that can perform calculation processing according to the software commands instead of FPGA apparatuses, by re-reading of software programs or by changing the subroutine read-out address, it is possible to adopt a configuration capable of supporting a plurality of communication schemes. Alternatively, instead of these apparatuses, it is possible to adopt a configuration using apparatuses such as so-called reconfigurable processors in which internal configuration and calculation contents can be changed dynamically at a higher speed than that of FPGA apparatuses. As a configuration of the reconfigurable processor, for example, it is possible to apply a configuration where a plurality of arithmetic logic sections (ALU) in which functions can be changed individually are provided, and the connection relationships among the arithmetic logic units can be changed, and a configuration capable of supporting a plurality of communication schemes by changing dynamically the calculation functions in each of the arithmetic logic units and the connection relationships. Alternatively, it is possible to provide a dedicated circuit in which processing specifications can be changed by changing the parameters for each of the function blocks such as filters, FFT and decoding processing, and apply a CPU device etc. having a so-called specific signal processing engine (co-processor) in which processing specifications can be changed in each of the function blocks (e.g., the number of taps and tap coefficients in the filter, the number of element points in the FFT processing, the number of the processing bits in the decoding processing, encoding rates and generator polynomials). In addition, a transmission processing section and a reception processing section have been configured using different apparatuses, but it is not limited to this example. Both transmission processing section and reception processing section can be configured in a single apparatus.

The case has been described where control section 104 is configured as an independent function section, however, it is not limited in these cases. For example, if upper layer processing section 103 is configured using a processor such as a CPU, the function of control section 104 can be included as one of the control software modules in the processing section. In this case, control signal 113 for functional change for each of reconfigurable radio processing sections 102a and 102b is supplied from upper layer processing section 103. In addition, received signals 110 outputted from each of reconfigurable radio processing sections 102a and 102b are supplied to upper layer processing section 103 along with the reception data.

In this embodiment, only the mode has been described as communication operation where data transmission is performed using compositely both communication scheme A and communication scheme B, and other modes have not been described. As other modes, application modes of performing communication independently using only one of the communication schemes can be considered. It is obvious that, in the range not exceeding the scope of the present invention, the operation control including these application modes can be performed.

In this embodiment, it has been assumed that a system using reconfigurable radio processing section 102a (hereinafter referred to as radio processing system a) and a system using reconfigurable radio processing section 102b (hereinafter referred to as radio processing system b) have similar configuration and functions, and the processing is carried out simultaneously in parallel. However, the present invention is not always limited to this. For example, radio processing system b can be configured to have limited performance and functions compared to radio processing system a and perform only the operation of periodically monitoring the quality of the communication links in the communication scheme at a different side from the scheme where communication is performed in radio processing system a. In this case, transmission modes which can be selected for communication control are limited compared to those shown in FIG. 6. For example, though transmission modes by MIMO and transmission modes by diversity cannot be selected, it is possible to adopt a configuration where the optimal system and scheme are selected from a plurality of radio processing systems and communication schemes according to the quality of the communication links to perform the communication, so that it is possible to implement a radio communication apparatus capable of supporting more flexibly according to the quality status of the communication links than the conventional apparatus.

The selection operation of the transmission mode in communication operation control section 1042 has been performed at a predetermined time interval, but the present invention is not limited to this. For example, an interval for performing the selection operation can be irregular or the selection operation can be performed when the inputted information concerning quality of the communication links in each communication scheme changes.

In this embodiment, a mode has been described where a cellular system is assumed as an example of communication scheme A and a wireless LAN system is assumed as an example of communication scheme B. However, these are illustrative examples, and they can be configured using other communication schemes. For example, it is possible to adopt a configuration supporting digital TV broadcasting and digital/audio broadcasting in the broadcasting system, or a configuration capable of supporting a communication scheme of the picocellular communication scheme (communication scheme in compliance with IEEE802.15 series standards). Moreover, it is possible to adopt a configuration using an original communication scheme by weak power transmission.

In this embodiment, the case has been described as an example where two systems of reconfigurable radio processing sections are provided and these two radio processing systems are operated simultaneously, but it is obvious that the number of the radio processing systems is not always limited to two. It is obvious that the configuration using three or more systems of radio processing sections can be applied by collecting the information concerning communication quality in each radio processing system and defining anew a determination table for determining an operation mode to support based on this information. In particular, if the number of radio processing systems is three or greater, it is possible to perform transmission by diversity or MIMO transmission using a part of the plurality of radio processing systems, and furthermore, set a transmission mode so as to perform diversity transmission between the communication schemes among other radio processing systems.

In the configuration of radio communication apparatus 100 in this embodiment, the configurations, connection modes and transmission methods of control signal 113 connected from control section 104 to each reconfigurable radio processing section 102 are not particularly limited in the present invention, and therefore it is not clearly indicated. However, as a configuration example, it is possible to adopt a configuration where a set of the bit data for indicating whether communication scheme A or communication scheme B is selected to support and the enable signals for allowing change of the setting is supplied as control signal 113, and in each of reconfigurable RF section and reconfigurable digital signal processing section, the setting is changed in the portion for functional change based on the supplied bit data and enable signals. Alternatively, it is possible to adopt a configuration where direct control lines to each setting change section are respectively provided, and control signal 113 outputted from configuration control section 1043 is directly supplied to each setting change section using each of the control lines, or supplied via a common bus.

Embodiment 2

Figure 11:
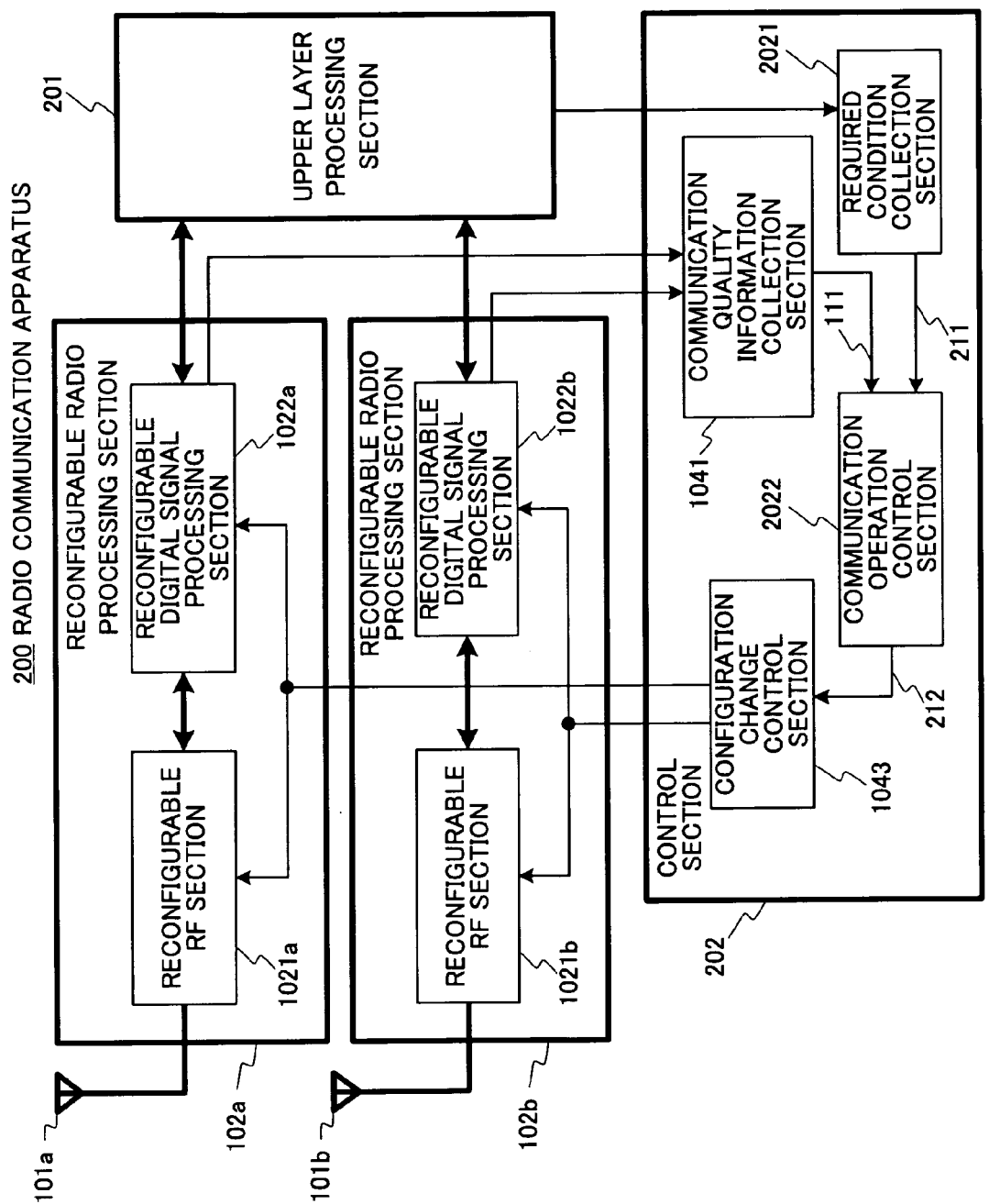
FIG. 11 is a block diagram showing a configuration of the radio communication apparatus according to Embodiment 2 of the present invention.

FIG. 11 shows a configuration example of the radio communication apparatus in Embodiment 2 of the present invention. In FIG. 11, the components having the same configuration and operation as shown in radio communication apparatus 100 shown in FIG. 3 in Embodiment 1 are assigned the same reference numerals as those in FIG. 3. Differences between radio communication apparatus 200 in this embodiment and radio communication apparatus 100 (FIG. 3) in Embodiment 1 are in that upper layer processing section 201 is provided instead of upper layer processing section 103, and control section 202 is provided instead of control section 104.

Upper layer processing section 201 performs basically similar operation to upper layer processing section 103, but as one of the processing in the upper layer, acquires the requirements for communication from users and performs processing for outputting the obtained information. In this embodiment, as an example of the requirements, it is assumed that the requirements from a user regarding fees for communication are selected by the user on the application software, and upper layer processing section 201 outputs the information regarding requirements selected by the user.

Control section 202 receives information 110*a* and 110*b* regarding the communication link quality of the signals received in each of a plurality of the reconfigurable radio processing sections 102*a* and 102*b* and requirements 210 set by the user in the applications etc. processed in the upper layer upon communication as inputs, determines the communication schemes and transmission modes that should be supported in each radio processing system based on these two information, and outputs control signals 113*a* and 113*b* for functional change to each of reconfigurable radio processing sections 102*a* and 102*b*. Control section 202 in this embodiment is configured with requirement collection section 2021, communication operation control section 2022, communication quality information collection section 1041 and configuration control section 1043. Among these components, communication quality information collection section 1041 and configuration control section 1043 have the same configuration and operation as those with the same reference numerals in FIG. 3, and therefore the explanation will be omitted.

Requirement collection section 2021 collects information 210 concerning the user's requirements supplied from upper layer processing section 201 and supplies collection result 211 to communication operation control section 2022. The details of the operation will be explained below.

Communication operation control section 2022 receives communication quality information 111 supplied from communication quality information collection section 1041 and collection result 211 supplied from requirement collection section 2021 as inputs, selects the communication schemes and transmission modes that should be supported in each radio processing system based on these information, and outputs selection result 212. An example of the specific determination procedure will be discussed later.

As an example of the communication service modes in this embodiment, it is assumed that, in the services using communication scheme A corresponding to cellular services, fees increases in accordance with the capacities of the data to be communicated, and, when multiple transmission by MIMO is performed using communication scheme A, there are additional fees. While in the services using communication scheme B corresponding to wireless LAN, the communication fees do not depend upon the data capacities, and even if multiple transmission by MIMO is performed, there are no additional fees. When transmission is performed by inter-system diversity using communication scheme A and communication scheme B, there are additional fees for both communication schemes.

As for the operation of radio communication apparatus 200 having the above-described configuration, the portions that are different from radio communication apparatus 100 in Embodiment 1 will be explained below.

As one of processing in the upper layer of communication, in upper layer processing section 201, the user sets the requirements concerning fees for communication. Specifically, in the application software executed in upper layer processing section 201, the user is asked to select a mode from a mode of saving communication fees (hereinafter referred to as fee-prior mode) or a mode of securing maintenance of the communication links or transmission rate even if it costs more fees (hereinafter referred to as communication-prior mode), and the information on the selected mode is stored.

Requirement collection section 2021 reads out information 210 concerning the mode selected by the user from upper layer processing section 201 and outputs the result as requirement collection result 211. On the other hand, communication quality information collection section 1041 performs similar operation as explained in Embodiment 1 and outputs communication quality information 111 concerning each communication scheme obtained from a plurality of reconfigurable radio processing sections 102a and 102b.

Communication operation control section 2022 selects communication schemes and transmission modes that should be supported in each of reconfigurable radio processing sections 102a and 102b for each predetermined time based on requirement collection result 211 and communication quality information 111, and supplies selection result 212 to configuration control section 1043. Here, an example of the communication schemes and transmission modes selected in communication operation control section 2022 is shown in FIG. 12.

The operation in each transmission mode will be explained using the selection table shown in FIG. 12. The transmission modes having the same names as those in selection table (FIG. 6) in Embodiment 1 perform the same operation as explained in Embodiment 1, and therefore the explanations are omitted.

In the case where the communication quality in communication scheme A is in a state of "Good" or "Fair" and in the case where the communication quality in communication scheme B is in a state of "Fair", the following two transmission modes are selected in accordance with the requirements set by the user. In the case where the user set a communication-prior mode of securing the transmission rate of the communication link, in order to secure the transmission rate, a transmission mode is selected to perform inter-scheme diversity communication in accordance with each communication link quality between communication scheme A and communication scheme B. On the other hand, in the case where the user sets a mode to save communication fees, so-called fee-prior mode, an inter-scheme diversity transmission mode that generates additional fees is not selected, and instead, a transmission mode using communication scheme B without generating communication fees is selected. In the selected transmission modes, whether reconfigurable radio processing sections 102a and 102b are set to support communication schemes is the same as in the case where the transmission modes having the same name in Embodiment 1 are selected.

In the case where the communication quality using communication scheme A is in a state of "Good" or "Fair", and in the case where the communication quality using communication scheme B is in a state of "Poor", the following two transmission modes are selected in accordance with the requirements set by the user. In the case where the communication-prior mode is set, a higher transmission speed may be achieved than in the case of using communication scheme A alone even though the communication quality using communication scheme B is in a "Poor" state. Thus, a transmission mode is selected to perform inter-scheme diversity communications in accordance with each communication link quality between communication scheme A and communication scheme B. On the other hand, if a fee-prior mode is set, a transmission mode using communication scheme A alone is selected.

In the case where the communication quality using communication scheme A is in a state of "Good" and the communication quality using communication scheme B is in a state of "Failed" and also in the case where a highest-quality mode is set, a high communication rate is secured by performing multiple transmission using a MIMO channel using communication scheme A. On the other hand, in the case where the fee-prior mode is set, in order to avoid additional fees in the multiple transmission using the MIMO channel, a transmission mode performing regular data transmission in communication scheme A alone using only reconfigurable radio processing section 102a is selected.

In the case of a combination of other communication link qualities, the same transmission mode as in Embodiment 1 is selected.

According to the above-described configuration, by selecting the processing contents in a plurality of reconfigurable radio processing sections based on the user's requirements in addition to the quality information obtained from the reconfigurable radio processing sections, it is possible to carry out communication using the appropriate communication scheme and transmission mode in accordance with the quality of communication links that changes from moment to moment among the communication schemes while satisfying the requirements from the user. As a result, it is possible to improve reliability of communication and the overall transmission capacities while satisfying the requirements from the user.

In this embodiment, the table in FIG. 12 has been shown as an example of the table for selecting a transmission mode. However, the present invention is not limited to the contents in this table. It is possible to diversify the selections for modes to be selected in accordance with the information concerning communication quality and user's requirements, or in reverse, integrate a plurality of selections. For example, it is possible to further diversify the selection table in the case of a communication-prior mode. When communication quality in communication scheme A is "good", communication quality in communication scheme B is "poor", and a sufficient transmission rate can not be achieved even though transmission by the inter-scheme diversity is performed, it is possible to set both reconfigurable radio processing sections 102a and 102b to support communication scheme A, and provide the selection table so as to perform multiple transmission using the MIMO channel in communication scheme A.

The embodiment has been described where a transmission mode is determined based on the selection table shown in FIG. 12, however, the present invention is not limited to the mode selection based on the selection table. For example, it is possible to adopt a configuration where parameters used as criterions are determined in advance according to user's requirements, quantitative assessment values concerning these parameters are calculated, and a transmission mode is determined based on the calculation results. Specifically, in the case where the user requests a mode prioritizing the communication rate, it is possible to adopt a configuration where the estimated value for the transmission rate obtained in the case of performing transmission in each transmission mode is calculated based on the communication quality in the current communication scheme, and a transmission mode is selected where this value becomes a maximum value. In addition, in the case where the user requests a mode prioritizing the saving of communication fees, it is possible to adopt a configuration where the estimated value of the communication fees generated in the case of transmitting data in a predetermined size in each transmission mode is calculated based on the communication quality in the current communication scheme, and a transmission mode is selected where this value becomes a minimum value.

In this embodiment, as requirements other than the information concerning communication quality, the embodiments have been described for the case of collecting communication reliability or requests for fees from the user, but the present invention is not limited to these cases. The present invention can be implemented in other embodiments. The essence of the present invention is to provide a plurality of reconfigurable radio processing sections and control sections, select appropriate communication schemes and transmission modes based on the communication quality information in each radio processing system and other requirements, and perform communication while performing control so as to change functions in the plurality of reconfigurable radio processing sections. Therefore, in the scope of not changing the essence of the present invention, implementation in a variety of modes is possible. For example, in the case of application in the upper layer transmitted from radio communication apparatus 200, if there is a requirement for the amount of delay in transmission, it is possible to provide a transmission mode selection table including this requirement and control the communication schemes and the transmission modes based on this table.

Embodiment 3

Figure 13:
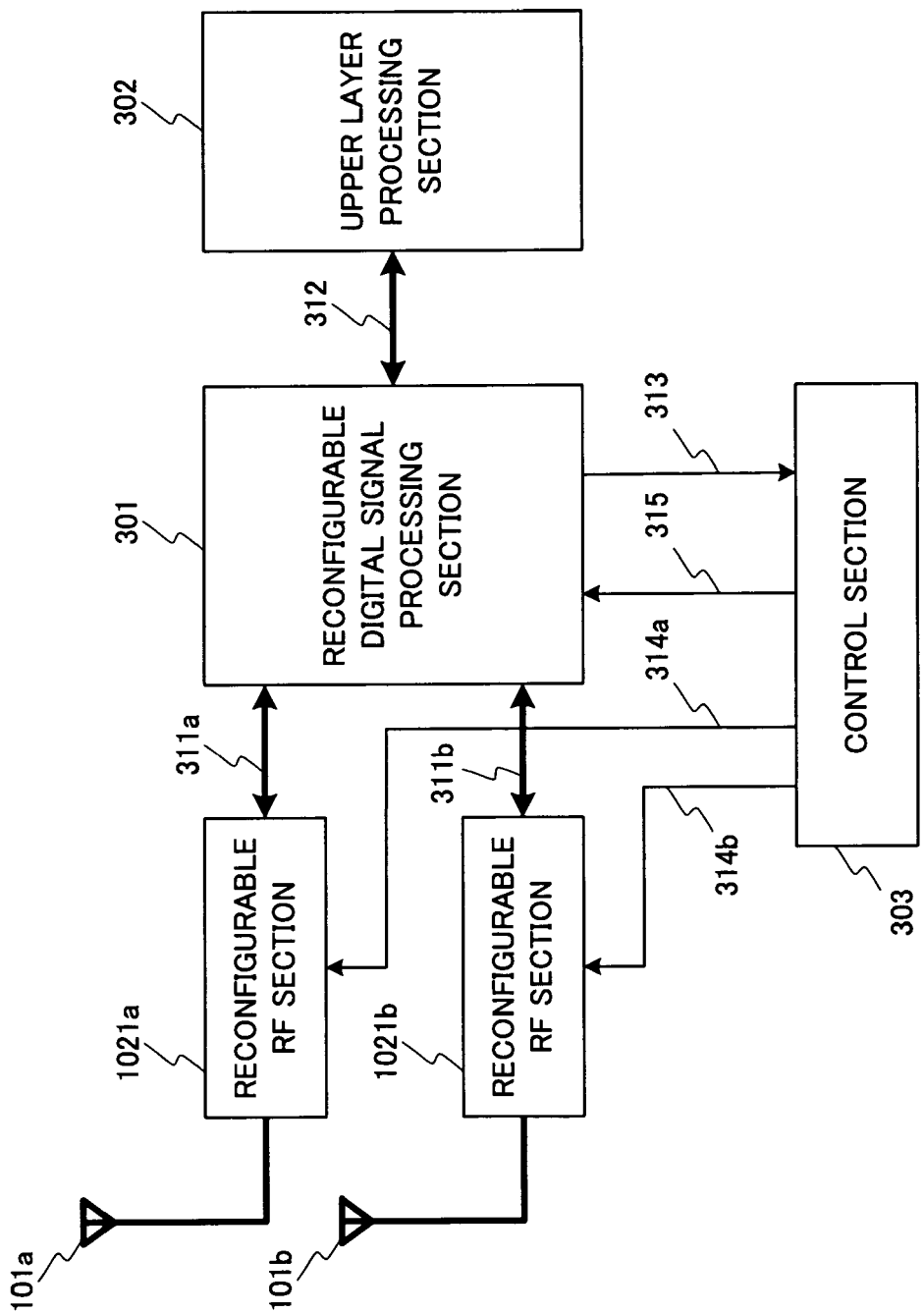
FIG. 13 is a block diagram showing a configuration of the radio communication apparatus according to Embodiment 3 of the present invention.

FIG. 13 shows a configuration example of the radio communication apparatus in Embodiment 3 of the present invention. In FIG. 13, the components having the same configuration and operation as those in radio communication apparatus 100 shown in FIG. 3 in Embodiment 1 are assigned the same reference numerals as those in FIG. 3. Differences between radio communication apparatus 300 in this embodiment and radio communication apparatus 100 (FIG. 3) in Embodiment 1 are in that reconfigurable digital signal processing section 301 is provided instead of reconfigurable digital signal processing sections 1022a and 1022b in reconfigurable radio processing sections 102a and 102b, upper layer processing section 302 is provided instead of upper layer processing section 103, and control section 303 is provided instead of control section 104.

Figure 14:
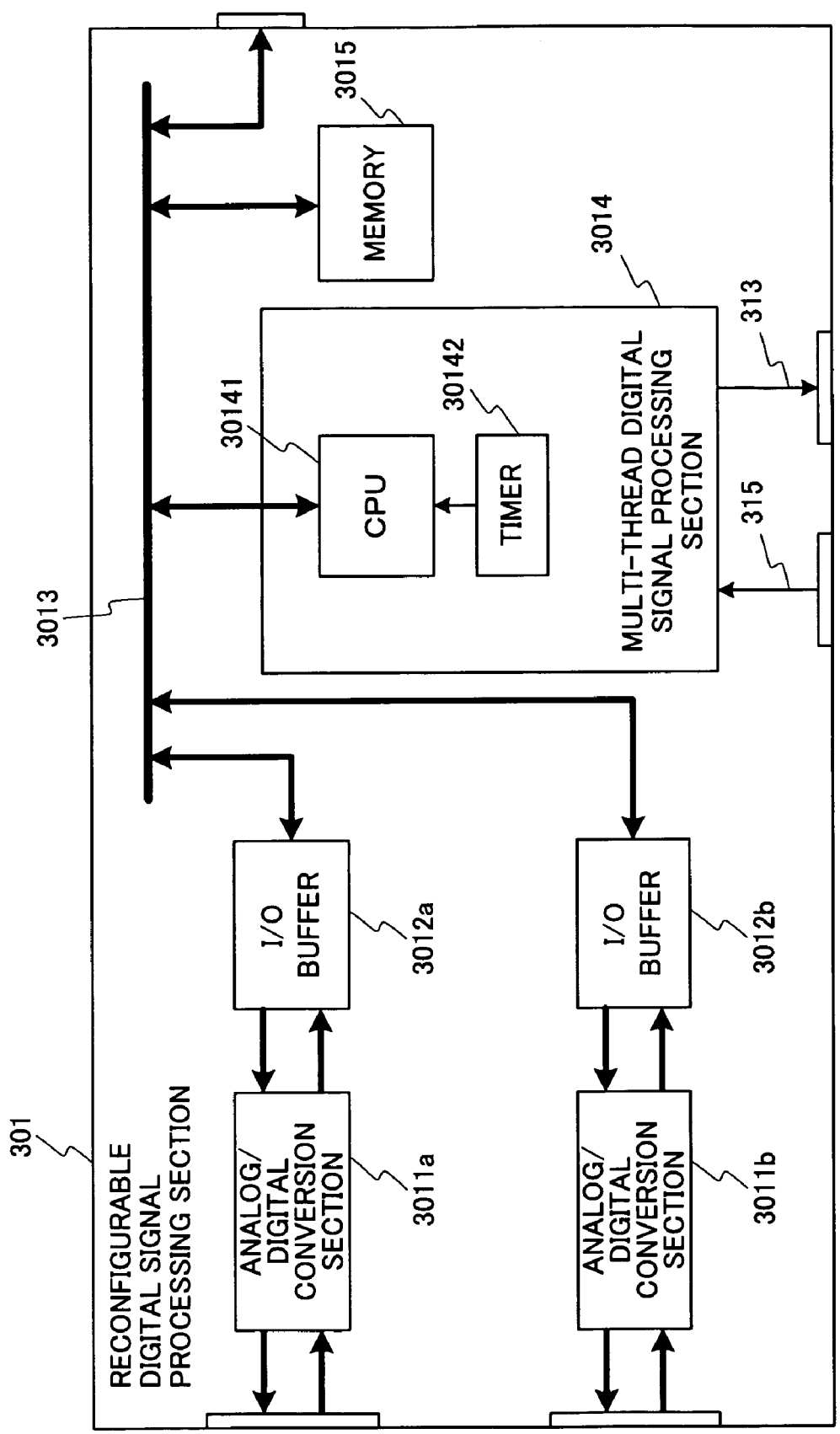
FIG. 14 is a block diagram showing a configuration example of the reconfigurable digital signal processing section according to Embodiment 3 of the present invention.

As shown in FIG. 14, reconfigurable digital signal processing section 301 has an input/output connection interface that inputs and outputs analog signals among the plurality of reconfigurable RF sections 1021a and 1021b, and an input/output connection interface that inputs and outputs transmission/reception data with the upper layer, and performs the same processing as the plurality of reconfigurable digital signal processing sections 1022a and 1022b shown in FIG. 3.

In this embodiment, as in Embodiment 1, an example of supporting two radio processing systems will be described. Reconfigurable digital signal processing 301 has analog/digital conversion sections 3011a and 3011b, I/O buffers 3012a and 3012b, bus 3013, multithread digital signal processing section 3014 and memory 3015.

Analog/digital conversion section 3011 has the same configuration and operation as analog/digital conversion section 10221 in FIG. 3.

Upon reception, I/O buffer 3012 temporarily stores digital signal sequences subjected to sampling outputted from analog/digital conversion section 3011, reads out the sequences in accordance with a predetermined regulation, and supplies the sequences to bus 3013. Upon transmission, I/O buffer temporarily stores digital signal sequences supplied via the bus, reads out the sequences based on the predetermined regulation, and supplies the sequence to analog/digital conversion section 3011. The buffer configuration is not particularly limited. For example, various known buffers such as a FIFO buffer and ring buffer can be applied.

Bus 3013 is a shared data transmission bus for performing transmission of digital data among a plurality of processing blocks, and connects by bus interface sections of a plurality of I/O buffers 3012a and 3012b, multithread digital signal processing section 3014, memory 3015 and external upper layer processing section 302. In the present invention, the detailed configuration of the bus and the details of the data transmission mode are not particularly limited.

Multithread digital signal processing section 3014 performs digital signal processing of the received signals inputted from the plurality of systems and digital signal processing of the transmission signals outputted to the plurality of systems by time division or parallel processing in a single processing system. Multithread digital signal processing section 3014 adopts a configuration where functions and characteristics can be changed according to control signal 315 for functional change. In addition, multithread digital signal processing section 3014 outputs received signals 313 obtained from each radio processing system to control section 303. In this embodiment, as a configuration example of multithread digital signal processing section 3014, multithread digital signal processing section 3014 is configured with reconfigurable apparatus 30141 (CPU) and timer 30142.

Reconfigurable apparatus 30141 performs desirable digital signal processing for the inputted digital signals and can change the contents of the digital signal processing according to control signal 315 for functional change. In this embodiment, reconfigurable apparatus 30141 is configured with a CPU (a central processing unit) that can change the contents of the desirable digital signal processing by changing the software program, and configured to read the software program as necessary from, for example, memory 3015. The software program is configured for each transmission mode as shown in FIG. 6 and FIG. 12 described in Embodiment 1, and stored in memory 3015. If changes in the transmission mode are determined, a corresponding software program is read out from memory 3015.

Timer 30142 provides an interrupt timing to CPU 30141 based on a predetermined timing clock.

Memory 3015 temporarily stores the data to be transmitted via bus 3013, performs read-out processing as necessary and stores digital data that is a target for the digital signal processing. Memory 3015 may be configured to store a software program describing the processing contents of CPU 30141.

Upper layer processing section 302 basically executes the same processing as upper layer processing section 103 in FIG. 3. Differences are that the input/output interface with the reconfigurable digital signal processing section is integrated in a single system instead of two systems, and the transmission/reception data for two radio processing systems is transmitted to reconfigurable digital signal processing section 301 via data bus 312 of the integrated one system.

Control section 303 basically has the same configuration and operation as control section 104 in FIG. 3. Difference are that control signals 314 (314a and 314b) for functional change to a plurality of reconfigurable RF sections 1021 and control signals 315 for functional change to reconfigurable digital signal processing section 301 are independently outputted instead of control signals 113 for functional change in a plurality of reconfigurable radio processing sections 102.

The operation of radio communication apparatus 300 having the above-described configuration will be explained below for the portions performing different operation from radio communication apparatus 100 as in Embodiment 1.

Upon reception, signals are received respectively in a plurality of reconfigurable RF sections 1021a and 1021b, and signals 311a and 311b subjected to signal processing are supplied to reconfigurable digital signal processing section 301, quantized to digital signals by analog/digital conversion sections 3011a and 3011b, and stored in memory 3015 via I/O buffers 3012a and 3012b. Multithread digital signal processing section 3014 sequentially reads the digital signals to be processed in CPU 30141 from memory 3015 where the signals are temporally stored, based on the periodical interrupt signals supplied from timer 30142, performs desirable signal processing, and supplies the obtained processing results to upper layer processing section 302 via bus 3013.

Upon transmission, the transmission data supplied from upper layer processing section 302 is inputted via bus 3013 and signal processing for a plurality of radio processing systems is performed by time division in CPU 30141 as with the case of the processing upon reception, and the generated transmission signals are supplied to each of reconfigurable RF sections 1021a and 1021b via I/O buffer 3012 and analog/digital conversion section 3011.

In this way, in radio communication apparatus 300, based on the quality information of the communication links in the plurality of communication schemes received in each radio processing system and the requirements provided by users as necessary, systems to be communicated and transmission modes are selected, the configurations of the plurality of reconfigurable RF sections 1021a and 1021b and reconfigurable digital signal processing section 301 of a single system are modified, and communication is performed in a desirable transmission mode.

According to the above-described configuration, when a plurality of reconfigurable radio processing sections where functions and performance can be changed are provided, by providing a plurality of desired systems in reconfigurable RF sections 1021a and 1021b, and configuring reconfigurable digital signal processing section 301 with a single system, and performing signal processing for a plurality of radio processing systems by time division or in parallel in reconfigurable digital signal processing section 301, it is not necessary to provide a plurality of systems of configurations of digital signal processing sections, so that it is possible to realize a small communication apparatus at a low cost, in addition to the advantages of Embodiment 1.

In this embodiment, a software program to be processed in CPU 30141 is configured for each transmission mode, and read from memory 3015 whenever changes are made in the transmission mode. However, the present invention is not limited to this embodiment. For example, if CPU 30141 contains an internal memory, all signal processing programs for a plurality of communication schemes are always resident in the internal memory, and only a necessary processing module can be selectively executed.

Figure 15:
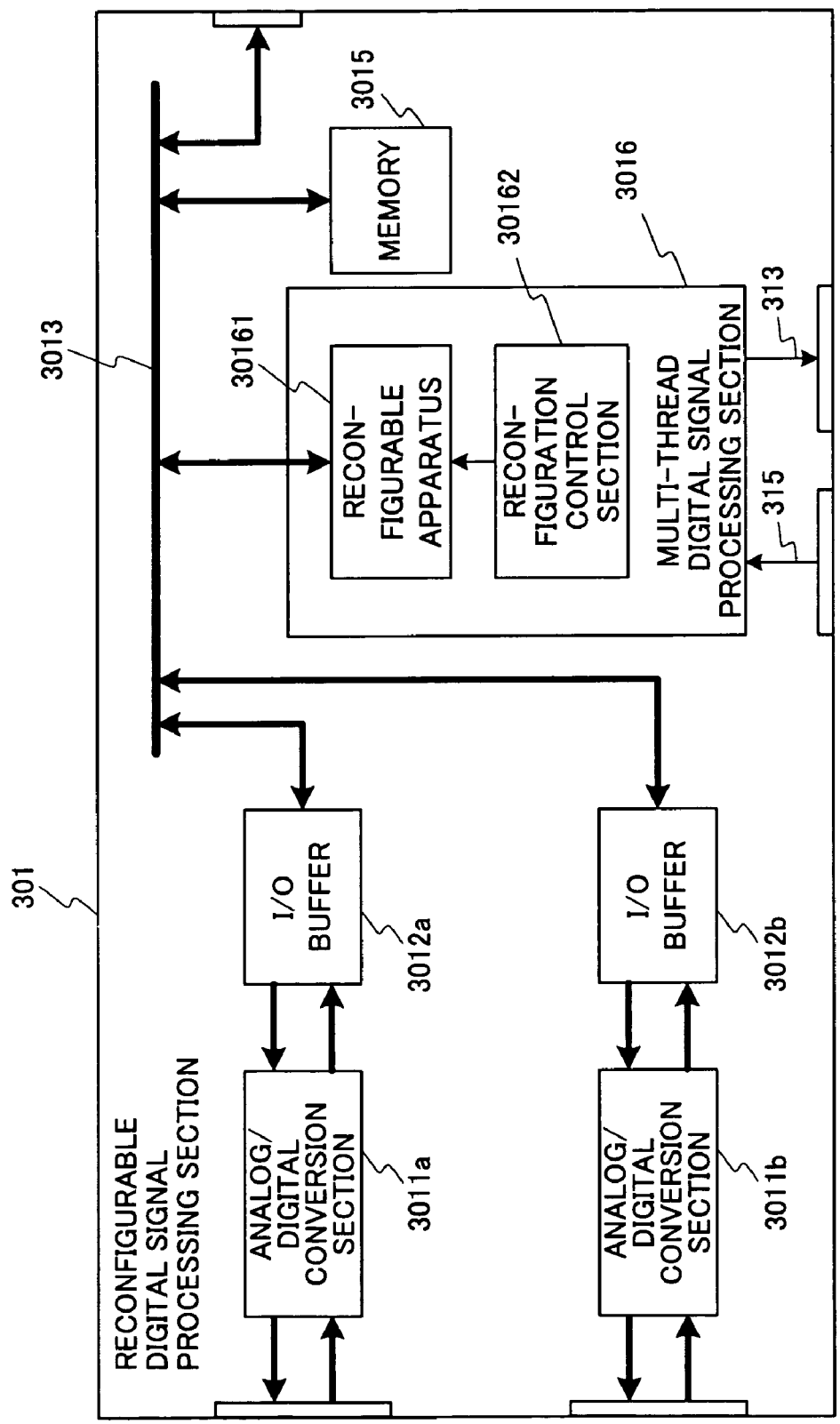
FIG. 15 is a block diagram showing another configuration example of the reconfigurable digital signal processing section according Embodiment 3 of the present invention.

In addition, multithread digital signal processing section 3014 is not limited to the configuration using CPU 30141 and timer 30142 as shown in FIG. 14. For example, as shown in FIG. 15, multithread digital signal processing section 3016 can be configured with reconfigurable apparatus 30161 and reconfiguration control section 3016. As reconfigurable apparatus 30161, for example, a plurality of operation units where the processing contents can be changed are configured in an array form and wirings between the intervals are configured so as to be arbitrarily changed. In addition, by changing parameters, it is possible to apply a combination of predetermined processing blocks that can be changed to a plurality of processing specifications. In this case, it can be configured by the combination of a plurality of predetermined processing blocks including a filter processing section where attenuation characteristics can be changed using parameters, a modulation/demodulation processing section where the supported modulation/demodulation scheme can be changed using parameters, and an error correction CODEC processing section where the error correction CODEC processing generator polynomials and error correction ability can be changed by changing parameters. Reconfiguration control section 30162 performs reconfiguration control over respective function blocks where the functions can be changed in reconfigurable apparatus 30161, based on control signal 315 for functional change. Using such a configuration, digital signal processing concerning communication may be divided into fine processing blocks, made to support communication schemes and transmission modes so that the processing contents are different for each fine processing block, and made to perform time division processing like pipelines. In addition, the CPU and reconfigurable device are not always necessary to be configured with a single device, and instead, it can be configured using a plurality of cores or devices. In this case, each processing for a plurality of radio processing systems can be subjected to processing in parallel for each core and each device, in addition to time-division processing.

Figure 16:
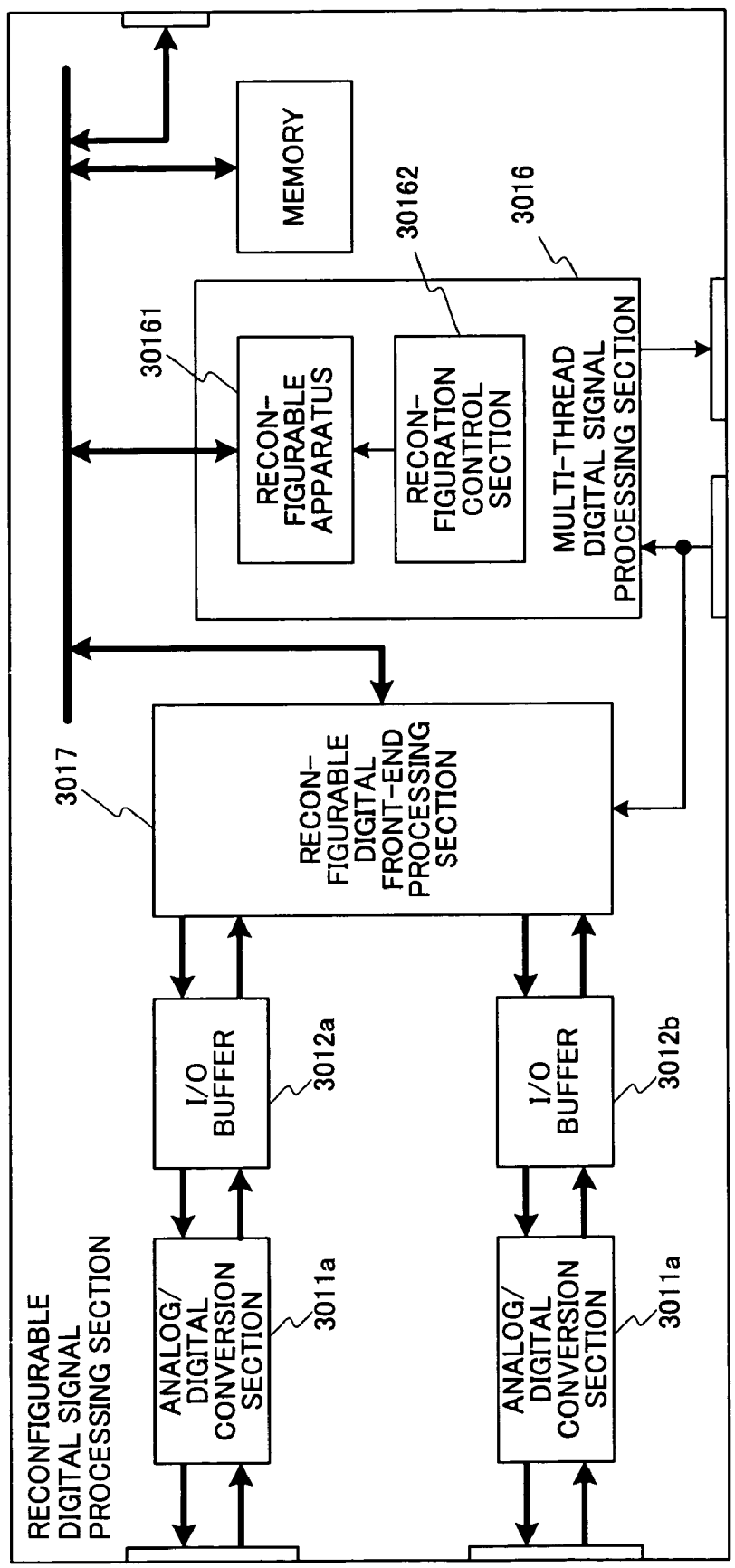
FIG. 16 is a block diagram showing another configuration example of the reconfigurable digital signal processing section according to Embodiment 3 of the present invention.
Figure 17:
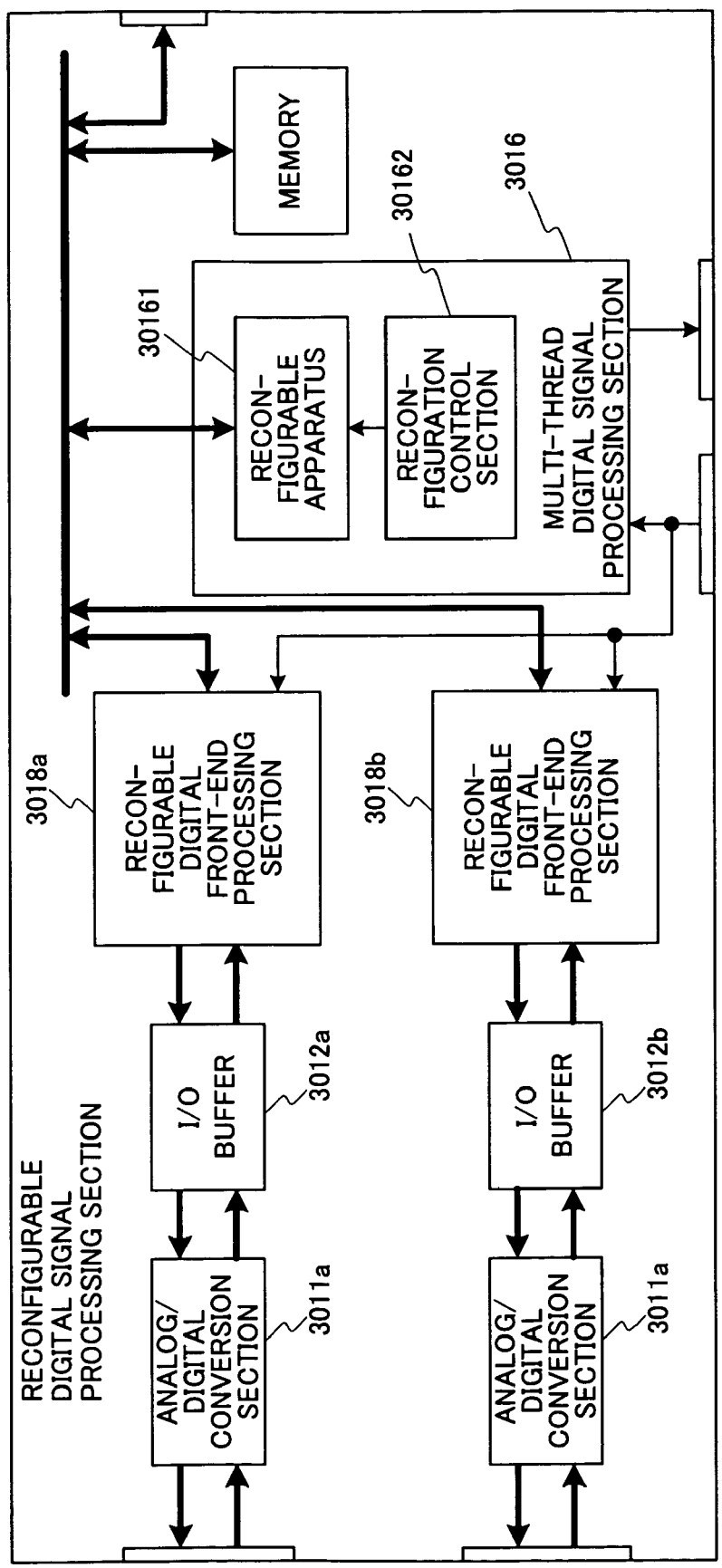
FIG. 17 is a block diagram showing another configuration example of the reconfigurable digital signal processing section according to Embodiment 3 of the present invention.

The signal processing in reconfigurable digital signal processing section 301 is not always limited to be executed using only the multithread digital signal processing as shown in FIG. 14 and FIG. 15. For applications not deviating from the essence of the present invention, it is possible to apply other configurations. For example, as shown in FIG. 16, it is possible to provide dedicated reconfigurable digital front-end processing section 3017 for the digital front-end processing section requiring high speed calculation processing and with large number of processing samples, among the digital signal processing for radio communication processing. Moreover, as shown in FIG. 17, dedicated reconfigurable digital front-end processing sections 3018a and 3018b can be provided for each radio processing system. Moreover, it is not limited to the configuration where target data for digital signal processing is inputted/outputted via bus 3013. It is possible to adopt a configuration where the input/output of reconfigurable digital front-end processing sections 3017, 3018a and 3018b can be directly connected to multithread digital signal processing section 3016.

Memory 3015 is not always necessarily configured as an independent device. Instead, it can be configured within the device of multithread digital signal processing section 3014.

Figure 18:
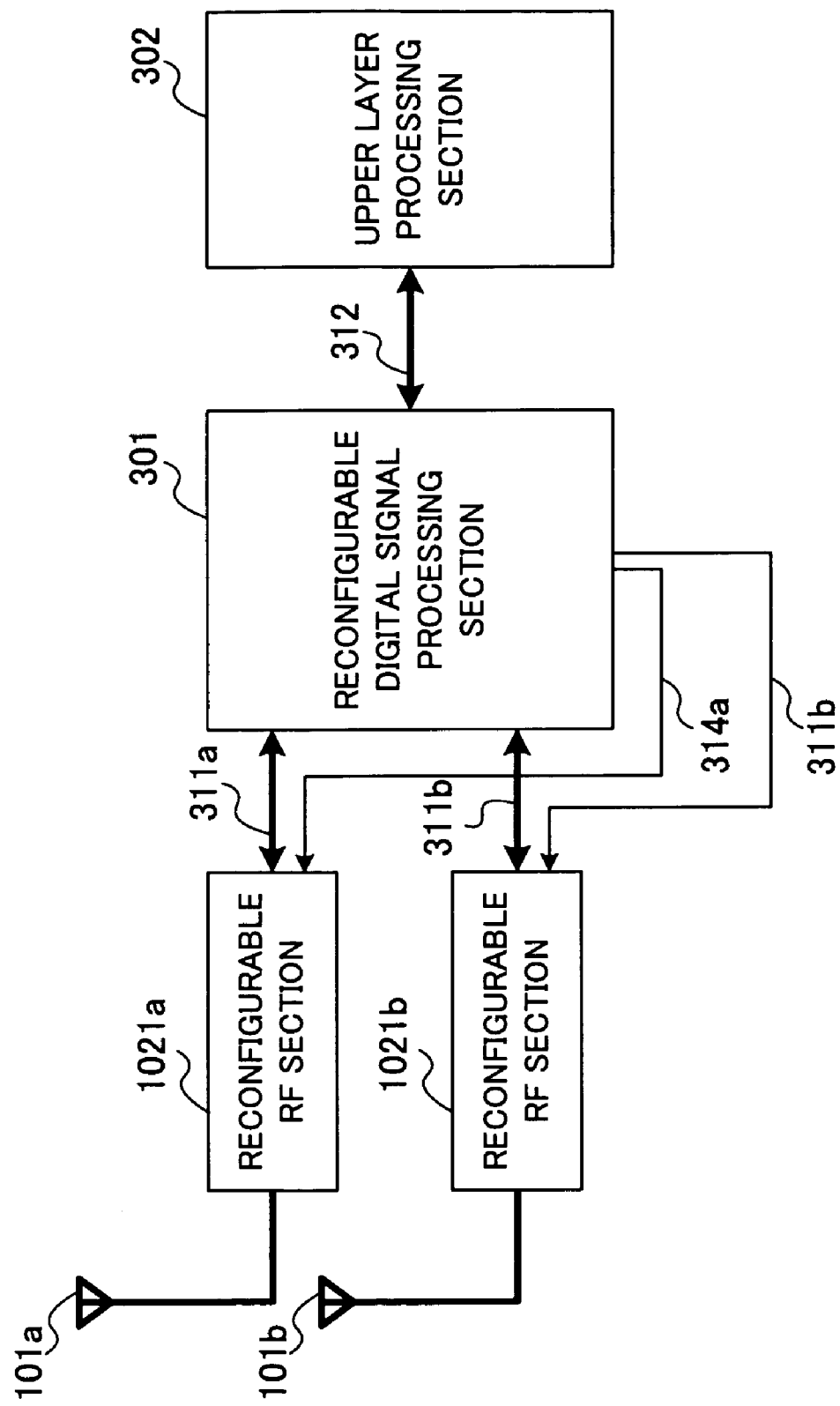
FIG. 18 is a block diagram showing another configuration example of the radio communication apparatus according to Embodiment 3 of the present invention.

Also, control section 303 is not always necessary to be an independent component. For example, as shown in FIG. 18, it is obvious that control section 303 can be configured to operate as a part of the processing contents in CPU 30141 or in reconfigurable apparatus 30161 in reconfigurable digital signal processing section 301.

Other Embodiments

Figure 19:
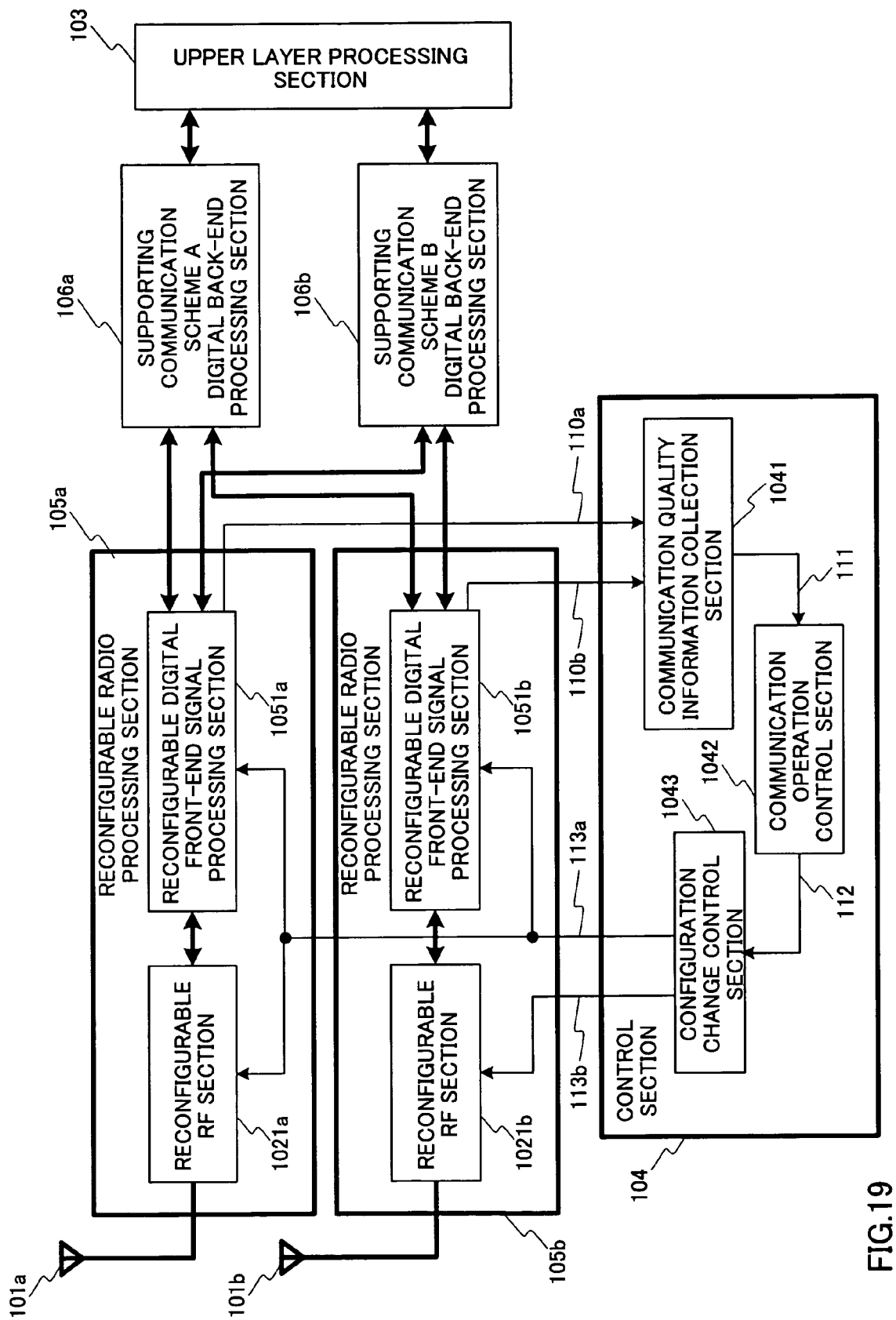
FIG. 19 is a block diagram showing a configuration of the radio communication apparatus according to another embodiment of the present invention.

The present invention can be implemented using the configuration shown in FIG. 19 instead of the configurations shown in FIG. 3, FIG. 11 and FIG. 13. That is, upon processing of each transmission, when there is a processing portion that performs signal processing for each radio processing system compositely, it is possible to remove this portion as an independent processing section and connect the section to each reconfigurable radio processing section. In the transmission modes using MIMO and diversity, it is possible to divide the portion into a processing portion where the processing should be independently performed for each branch (radio processing system) and a processing portion where digital signals supplied (or to be supplied) from each branch are processed compositely. For example, it is necessary to perform processing for reception channel selection (or filter processing for transmission frequency band limitation) and demodulation processing independently in each branch, and here, this processing group is referred to as digital front-end processing. It requires a portion that performs processing from each branch (or to branch) compositely to perform division (or synthesis) for diversity and MIMO multiplexing (or separation processing for the multiplexed signals) and the CODEC processing. This processing group is referred to as a digital back-end processing section. In this case, the digital front-end processing section adopts a configuration 1051a and 1051b where the function can be changed according to the selected communication scheme. For the digital back-end processing, it is possible to adopt a configuration where dedicated circuits 106a and 106b are provided for each supported communication scheme, and the functions of the reconfigurable digital front-end processing section are switched as necessary to perform digital front-end processing, and digital back-end processing is performed using a corresponding digital back-end processing section. Moreover, it is possible to integrate digital back-end processing sections 106a and 106b provided in a dedicated way for each supported communication scheme as shown in FIG. 19 to the multithread signal processing section that can support both processing by functional change, and implement the configuration shown in FIG. 17. The configuration in FIG. 17 has been described in Embodiment 3.

Figure 20:
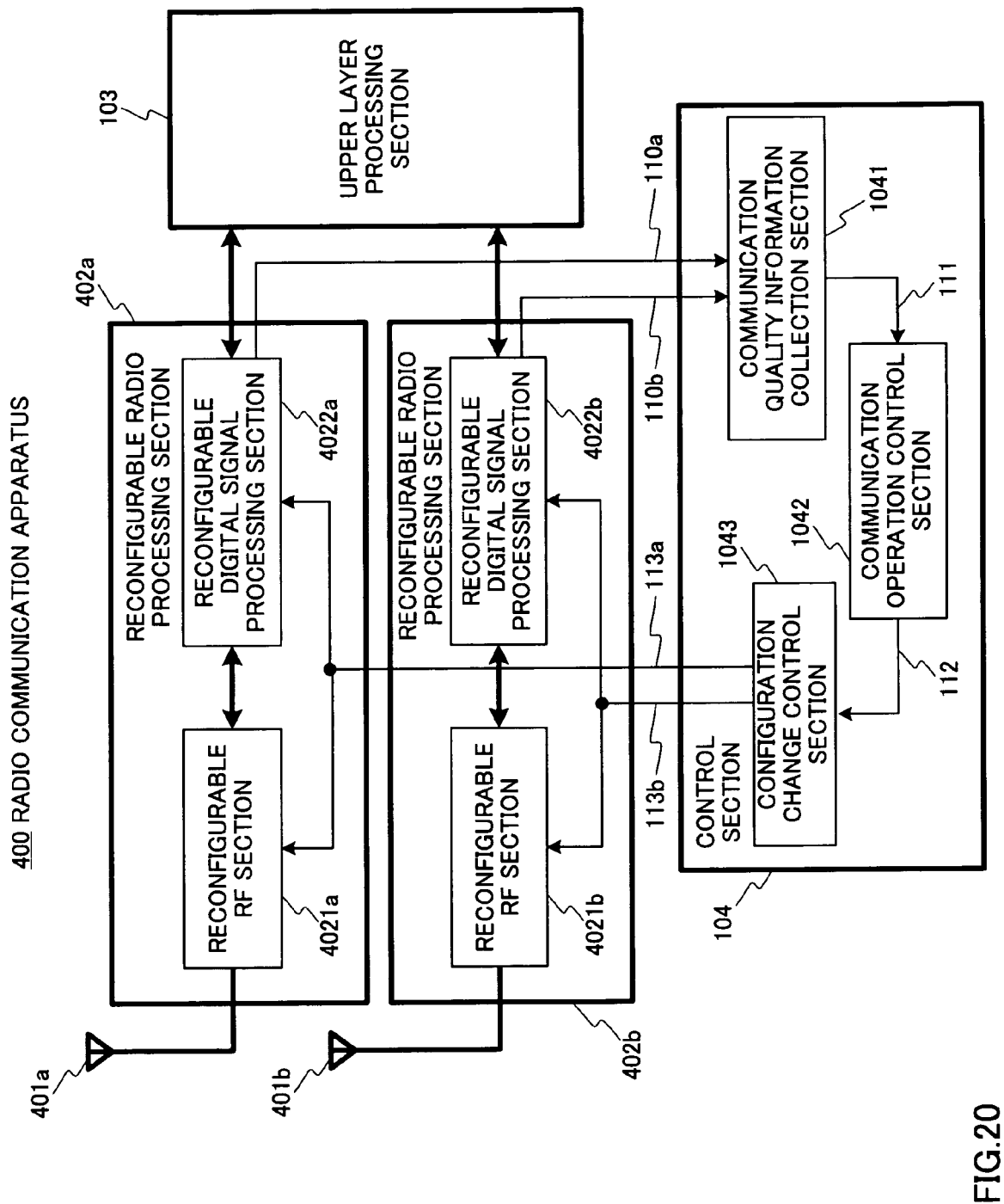
FIG. 20 is a block diagram showing a configuration of the radio communication apparatus according to another embodiment of the present invention.

The present invention can be executed using the configuration shown in FIG. 20. In FIG. 20, the components having the same configuration and operation as in radio communication apparatus 100 shown in FIG. 3 are assigned the same reference numerals. Differences between radio communication apparatus 400 shown in FIG. 20 and radio communication apparatus 100 are that antennas 401a and 401b, reconfigurable RF sections 402a and 402b, and reconfigurable digital signal processing sections 4022a and 4022b are provided instead of antennas 101a and 101b, reconfigurable RF sections 1021a and 1021b, and reconfigurable digital signal processing sections 1022a and 1022b. The characteristic point in these components is that the components in radio processing system a having "a" at the end are not necessarily identical to the components in radio processing system b having "b" at the end. Specifically, antenna 401a, reconfigurable RF section 4021a and reconfigurable digital signal processing section 4022a having radio processing system a are optimized in terms of functions and performance in communication scheme A, and are configured to satisfy minimum required specifications for the radio communication standards adopting communication scheme B by changing functions and performance of the components in a small scale. On the other hand, antenna 401b, reconfigurable RF section 4021b and reconfigurable digital signal processing section 4022b having radio processing system b are optimized in terms of functions and performance in communication scheme B, and are configured to satisfy minimum required specifications for the radio communication standards adopting communication scheme A by changing functions and performance of the components in a small scale. By adopting such a configuration, for example, as a reception sensitivity characteristic for communication scheme A, there is a case where the performance of radio processing system b deteriorates compared to the performance of radio processing system a. Similarly, as a reception sensitivity characteristic for communication scheme B, there is a case where the performance of radio processing system a deteriorates compared to the performance of radio processing system b. Even in this case, the present invention can be implemented and have the characteristic of controlling communication so that communication can be performed efficiently by selecting the appropriate communication scheme and transmission mode and changing the function.

The configuration examples of radio processing systems a and b having the above-described characteristics will be explained as follows. By designing antennas 401a and 401b to have wideband passing characteristics or multi-band passing characteristics, it is possible to implement performance to cover the RF frequency band used both in communication schemes A and B. However, if the performance is optimized for the frequency band used in one of the schemes, a difference in performance may occur naturally. When reconfigurable RF sections 4021a and 4021b contain a switching element for switching to support communication schemes by adjusting the operation point by changing impedance of the elements in the circuits or biases of the active devices, a difference in performance may occur naturally when the performance is optimized for the case of being used in one of the schemes. Further, upon digital filter processing or correlation calculation processing, reconfigurable digital signal processing sections 4022a and 4022b are fixedly designed with a tap length suitable for one of communication schemes, and upon supporting the other communication scheme, though the tap length is not changed, tap coefficients are changed to coefficients suitable for the other communication scheme, and thereby it may be possible to implement performance meeting the required specifications even if optimum performance cannot be obtained upon supporting the other communication scheme. With respect to the bit calculation accuracy upon performing calculation processing, when it is fixedly designed with calculation accuracy to be suitable for one of the communication schemes, upon supporting the other communication scheme, the calculation accuracy may become insufficient.

Thus, when it is configured in each radio processing system so that the performance is optimized for the mainly supported communication scheme, the performance becomes different among the radio processing systems upon communication, such as MIMO and diversity, in the transmission modes necessary to set functions to the same communication scheme for the radio processing systems, performance obtained among the radio processing systems is different, and thereby deterioration is expected in terms of the communication performance. However, in the case of the service modes where the amount of performance deterioration is within the allowable range, by adopting the above-described configuration, it is possible to reduce the components that should be reconfigurable in each radio processing system and reduce the degree of redundancy in circuits. As a result, the circuit scale and power consumption can be reduced.

When communication is performed with such a configuration, when the information concerning the communication quality of the supported communication scheme in each radio processing system is collected, the estimation standards for quality estimation as shown in FIG. 10 can be used with slight corrections.

The present application is based on the Japanese Patent Application No. 2004-176223 filed on Jun. 14, 2004, the entire content of which is expressly incorporated by reference herein.

INDUSTRIAL APPLICABILITY

The radio communication apparatus of the present invention has an advantage of enabling to support various operation such as diversity transmission, MIMO transmission, handover and diversity between the systems with a single communication apparatus, and useful as a configuration of the communication apparatus for implementing high efficient radio communication.

The invention claimed is:

1. A radio communication apparatus comprising:
a plurality of antennas;
a plurality of reconfigurable radio processing sections that are provided corresponding to the antennas, each of said reconfigurable radio processing sections being configured for supporting at least two different communication schemes respectively, the at least two different communication schemes corresponding to different types of communication networks respectively; and
a control section that controls each of the plurality of reconfigurable radio processing sections independently, and changes processing contents, including the communication schemes, of each of the reconfigurable radio processing sections independently based on respective communication quality information relating to the at least two different communication schemes,
wherein the control section comprises:
a quality information collection section that collects the communication quality information of a signal after processing by each of the reconfigurable radio processing sections;
a processing selection section that selects the processing contents of each of the reconfigurable radio processing sections based on the communication duality information collected by the quality information collection section; and
a processing change control section that changes the processing contents previously in each of the reconfigurable radio processing sections to the processing contents selected in the processing selection section;
wherein the processing selection section receives other requirements in addition to the communication quality information as inputs and selects the processing contents in each of the reconfigurable radio processing sections based on the communication quality information and the other requirements, and
wherein the other requirements comprise requirements based on a usage fee from a user.

2. The radio communication apparatus according to claim 1, wherein the processing selection section and the processing change control section selectively set a transmission mode of the radio communication apparatus to a mode for performing diversity transmission using only a single one of the communication schemes, a mode for performing space multiplexing transmission in a MIMO channel, a mode for performing diversity transmission among a plurality of the communication schemes, a mode for performing communication by antenna directivity control using only a single one of the communication schemes, or a mode for performing transmission using only a single one of the communication schemes.

3. The radio communication apparatus according to claim 1, wherein the other requirements comprise requirements from one or more applications used in an upper layer.

4. The radio communication apparatus according to claim 1, wherein each reconfigurable radio processing section comprises:
a reconfigurable RF section that obtains a baseband analog received signal by performing a predetermined amplification operation, frequency conversion and filter processing on a radio received signal received at the corresponding antenna and obtains a radio transmission signal by performing the predetermined amplification operation, the frequency conversion and the filter processing on a baseband analog transmission signal and supplies the radio transmission signal to the corresponding antenna,
wherein functions and performance of high frequency signal processing can be changed according to a control signal; and
a reconfigurable digital signal processing section that obtains received data by performing analog/digital conversion and predetermined digital signal processing on the baseband analog received signal obtained in the reconfigurable RF section, obtains the baseband analog transmission signal by performing the predetermined digital signal processing and the digital/analog conversion on transmission data, and supplies the baseband analog transmission signal to the reconfigurable RF section,
wherein contents and functions of the digital signal processing can be changed according to the control signal.

5. The radio communication apparatus according to claim 4, wherein a number of the reconfigurable digital signal processing sections is set to be less than a number of the reconfigurable RF sections, and the reconfigurable digital signal processing sections perform processing supporting a plurality of connected reconfigurable RF sections by time division or in parallel.

6. The radio communication apparatus according to claim 5, wherein each reconfigurable digital signal processing section comprises a CPU and a timer and performs the processing supporting the plurality of the connected reconfigurable RF sections in the CPU according to a timing generated at the timer.

7. The radio communication apparatus according to claim 1, wherein the configurations of the plurality of reconfigurable radio processing sections are not all the same and some of the reconfigurable radio processing sections have a configuration with limited performance or functions.

8. The radio communication apparatus according to claim 7, wherein whether or not a communication scheme other than a current communication scheme is in a service area is monitored or communication quality is estimated using the reconfigurable radio processing sections having a configuration with limited performance or functions.

9. A radio communication apparatus comprising:
a plurality of antennas;
a plurality of reconfigurable radio processing sections that are provided corresponding to the antennas, each of said reconfigurable radio processing sections being configured for supporting at least two different communication schemes respectively, the at least two different communication schemes corresponding to different types of communication networks respectively; and a control section that controls each of the plurality of reconfigurable radio processing sections independently and changes processing contents, including the communication schemes of each of the reconfigurable radio processing sections independently based on respective communication quality information relating to the at least two different communication schemes, wherein each reconfigurable radio processing section comprises:

a reconfigurable RF section that obtains a baseband analog received signal by performing a predetermined amplification operation, frequency conversion and filter processing on a radio received signal received at the corresponding antenna and obtains a radio transmission signal by performing the predetermined amplification operation, the frequency conversion and the filter processing on a baseband analog transmission signal and supplies the radio transmission signal to the corresponding antenna, wherein functions and performance of high frequency signal processing can be changed according to a control signal; and a reconfigurable digital signal processing section that obtains received data by performing analog/digital conversion and predetermined digital signal processing on the baseband analog received signal obtained in the reconfigurable RF section, obtains the baseband analog transmission signal by performing the redetermined digital signal processing and the digital/analog conversion on transmission data, and supplies the baseband analog transmission signal to the reconfigurable RF section, wherein contents and functions of the digital signal processing can be changed according to the control signal, wherein a number of the reconfigurable digital signal processing sections is set to be less than a number of the reconfigurable RF sections, and the reconfigurable digital signal processing sections perform processing supporting a plurality of connected reconfigurable RF sections by time division or in parallel, and wherein each reconfigurable digital signal processing section comprises a reconfigurable device that can dynamically reconfigure digital signal processing contents and a timer, and performs processing supporting the plurality of the connected reconfigurable RF sections according to a timing generated at the timer.

10. A radio communication apparatus comprising:

a plurality of antennas;

a plurality of reconfigurable radio processing sections that are provided corresponding to the antennas, each of said reconfigurable radio processing sections being configured for supporting at least two different communication schemes respectively, the at least two different communication schemes corresponding to different types of communication networks respectively; and a control section that controls each of the plurality of reconfigurable radio processing sections independently, and changes processing contents, including the communication schemes, of each of the reconfigurable radio processing sections independently based on respective communication quality information relating to the at least two different communication schemes, wherein each reconfigurable radio processing section comprises:

a reconfigurable RF section that obtains a baseband analog received signal by performing a predetermined amplification operation, frequency conversion and filter processing on a radio received signal received at the corresponding antenna and obtains a radio transmission signal by performing the predetermined amplification operation, the frequency conversion and the filter processing on a baseband analog transmission signal and supplies the radio transmission signal to the corresponding antenna wherein functions and performance of high frequency signal processing can be changed according to a control signal; and a reconfigurable digital signal processing section that obtains received data by performing analog/digital conversion and predetermined digital signal processing on the baseband analog received signal obtained in the reconfigurable RF section, obtains the baseband analog transmission signal by performing the predetermined digital signal processing and the digital/analog conversion on transmission data, and supplies the baseband analog transmission signal to the reconfigurable RF section, wherein contents and functions of the digital signal processing can be changed according to the control signal; and wherein the processing contents that are executed in the plurality of reconfigurable digital signal processing sections are divided into digital front-end processing sections and digital back-end processing sections, digital front-end processing is performed according to the control signal in the reconfigurable digital front-end processing sections where the processing contents and the functions can be changed, and digital back-end processing is performed in a plurality of the digital back-end processing sections having different functions.

11. The radio communication apparatus according to claim 10, wherein the reconfigurable digital front-end processing sections are provided for each of a plurality of radio processing systems.

12. The radio communication apparatus according to claim 11, wherein a number of the reconfigurable digital front-end processing sections is set to be less than a number of the reconfigurable RF sections, and the reconfigurable digital front-end processing sections perform the digital front-end processing supporting a plurality of connected reconfigurable RF sections by time division or in parallel.

\* \* \* \* \*